(12) United States Patent
Balasubramanian et al.

(10) Patent No.: US 12,271,866 B2
(45) Date of Patent: Apr. 8, 2025

(54) METHODS AND SYSTEMS FOR CREATING SOFTWARE ECOSYSTEM ACTIVITY SCORE FROM MULTIPLE SOURCES

(71) Applicant: Open Weaver Inc., Miami, FL (US)

(72) Inventors: Ashok Balasubramanian, Chennai (IN); Karthikeyan Krishnaswamy Raja, Chennai (IN); Meenakshisundaram Chinnappan, Chennai (IN); Lakshmipathy Ganesh Eswaran, Chennai (IN)

(73) Assignee: Open Weaver Inc., Miami, FL (US)

( * ) Notice: Subject to any disclaimer, the term of this patent is extended or adjusted under 35 U.S.C. 154(b) by 66 days.

(21) Appl. No.: 17/680,683

(22) Filed: Feb. 25, 2022

(65) Prior Publication Data
US 2022/0277270 A1    Sep. 1, 2022

Related U.S. Application Data

(60) Provisional application No. 63/154,362, filed on Feb. 26, 2021.

(51) Int. Cl.
    *G06F 16/00*     (2019.01)
    *G06F 8/77*     (2018.01)
    (Continued)

(52) U.S. Cl.
    CPC ............ *G06Q 10/103* (2013.01); *G06F 8/77* (2013.01); *G06Q 10/0639* (2013.01)

(58) Field of Classification Search
    CPC ..... G06F 8/77; G06Q 10/103; G06Q 10/0639
    (Continued)

(56) References Cited

U.S. PATENT DOCUMENTS

| | | |
|---|---|---|
| 5,953,526 A | 9/1999 | Day et al. |
| 7,322,024 B2 | 1/2008 | Carlson et al. |
| | (Continued) | |

FOREIGN PATENT DOCUMENTS

| | | |
|---|---|---|
| CN | 108052442 A | 5/2018 |
| KR | 10-2020-0062917 | 6/2020 |
| | (Continued) | |

OTHER PUBLICATIONS

S. Bayati, D. Parsons, T. Susnjakand M. Heidary, "Big data analytics onl arge-scale socio-technical software engineering archives," 2015 3rd International Conference on Information and Communication Technology (ICoICT), Nusa Dua, Bali, Indonesia, 2015, pp. 65-69, doi:1 0.1109/ ICoICT.2015.7231398. (Year: 2015).*

(Continued)

*Primary Examiner* — Charles Rones
*Assistant Examiner* — Shirley D Hicks
(74) *Attorney, Agent, or Firm* — Foley & Lardner LLP

(57) ABSTRACT

Systems and methods for automatically scoring ecosystem activity are disclose. The method includes receiving data from repositories and developer forums related to a software project, calculating a popularity score of the software project based on the received data, evaluating forks data of forks of the software project, calculating a project activity score of the software project based on the received data and the evaluated forks data, calculating a defect score, calculating a community score by evaluating posts of the developer forums on the software project, calculating a solution score by evaluating solutions provided as a response to queries on the software project, calculating a sentiment score by aggregating and analyzing identified positive and negative sentiments, calculating a userbase score, and calculating an ecosystem activity score based on one or more individual scores.

22 Claims, 12 Drawing Sheets

(51) Int. Cl.
*G06Q 10/0639* (2023.01)
*G06Q 10/10* (2023.01)

(58) Field of Classification Search
USPC .................................................. 707/600–899
See application file for complete search history.

(56) References Cited

U.S. PATENT DOCUMENTS

| | | | |
|---|---|---|---|
| 7,703,070 B2 | 4/2010 | Bisceglia | |
| 7,774,288 B2 | 8/2010 | Acharya et al. | |
| 7,958,493 B2 | 6/2011 | Lindsey et al. | |
| 8,010,539 B2 | 8/2011 | Blair-Goldensohn et al. | |
| 8,051,332 B2 | 11/2011 | Zakonov et al. | |
| 8,112,738 B2 | 2/2012 | Pohl et al. | |
| 8,112,744 B2 | 2/2012 | Geisinger | |
| 8,219,557 B2 | 7/2012 | Grefenstette et al. | |
| 8,296,311 B2 | 10/2012 | Rapp et al. | |
| 8,412,813 B2 | 4/2013 | Carlson et al. | |
| 8,417,713 B1 | 4/2013 | Blair-Goldensohn et al. | |
| 8,452,742 B2 | 5/2013 | Hashimoto et al. | |
| 8,463,595 B1 | 6/2013 | Rehling et al. | |
| 8,498,974 B1 | 7/2013 | Kim et al. | |
| 8,627,270 B2 | 1/2014 | Fox et al. | |
| 8,677,320 B2 | 3/2014 | Wilson et al. | |
| 8,688,676 B2 | 4/2014 | Rush et al. | |
| 8,838,606 B1 | 9/2014 | Cormack et al. | |
| 8,838,633 B2 | 9/2014 | Dhillon et al. | |
| 8,935,192 B1 | 1/2015 | Ventilla et al. | |
| 8,943,039 B1 | 1/2015 | Grieselhuber et al. | |
| 9,015,730 B1 | 4/2015 | Allen et al. | |
| 9,043,753 B2 | 5/2015 | Fox et al. | |
| 9,047,283 B1 | 6/2015 | Zhang et al. | |
| 9,135,665 B2 | 9/2015 | England et al. | |
| 9,176,729 B2 | 11/2015 | Mockus et al. | |
| 9,201,931 B2 | 12/2015 | Lightner et al. | |
| 9,268,805 B2 | 2/2016 | Crossley et al. | |
| 9,330,174 B1 | 5/2016 | Zhang | |
| 9,361,294 B2 | 6/2016 | Smith | |
| 9,390,268 B1 | 7/2016 | Martini et al. | |
| 9,471,559 B2 | 10/2016 | Castelli et al. | |
| 9,558,098 B1 | 1/2017 | Alshayeb et al. | |
| 9,589,250 B2 | 3/2017 | Palanisamy et al. | |
| 9,626,164 B1 | 4/2017 | Fuchs | |
| 9,672,554 B2 | 6/2017 | Dumon et al. | |
| 9,977,656 B1 | 5/2018 | Mannopantar et al. | |
| 10,305,758 B1 | 5/2019 | Bhide et al. | |
| 10,474,509 B1 | 11/2019 | Dube et al. | |
| 10,484,429 B1 | 11/2019 | Fawcett et al. | |
| 10,761,839 B1 | 9/2020 | Migoya et al. | |
| 10,922,740 B2 | 2/2021 | Gupta et al. | |
| 10,983,760 B2 | 4/2021 | Guan | |
| 11,023,210 B2 | 6/2021 | Li et al. | |
| 11,238,027 B2 | 2/2022 | Frost et al. | |
| 11,256,484 B2 | 2/2022 | Nikumb et al. | |
| 11,288,167 B2 | 3/2022 | Vaughan | |
| 11,294,984 B2 | 4/2022 | Kittur et al. | |
| 11,295,375 B1 | 4/2022 | Chitrapura et al. | |
| 11,301,631 B1 | 4/2022 | Atallah et al. | |
| 11,334,351 B1 | 5/2022 | Pandurangarao et al. | |
| 11,461,093 B1 | 10/2022 | Edminster et al. | |
| 11,474,817 B2 | 10/2022 | Sousa et al. | |
| 11,893,117 B2 | 2/2024 | Segal et al. | |
| 11,966,446 B2 | 4/2024 | Socher et al. | |
| 2001/0054054 A1 | 12/2001 | Olson | |
| 2002/0059204 A1 | 5/2002 | Harris | |
| 2002/0099694 A1 | 7/2002 | Diamond et al. | |
| 2002/0150966 A1 | 10/2002 | Muraca | |
| 2002/0194578 A1 | 12/2002 | Irie et al. | |
| 2004/0243568 A1 | 12/2004 | Wang et al. | |
| 2006/0090077 A1 | 4/2006 | Little et al. | |
| 2006/0104515 A1 | 5/2006 | King et al. | |
| 2006/0200741 A1 | 9/2006 | Demesa et al. | |
| 2006/0265232 A1 | 11/2006 | Katariya et al. | |
| 2007/0050343 A1 | 3/2007 | Siddarampappa et al. | |
| 2007/0168946 A1 | 7/2007 | Drissi et al. | |
| 2007/0185860 A1 | 8/2007 | Lissack | |
| 2007/0234291 A1 | 10/2007 | Ronen et al. | |
| 2007/0299825 A1 | 12/2007 | Rush et al. | |
| 2009/0043612 A1 | 2/2009 | Szela et al. | |
| 2009/0319342 A1 | 12/2009 | Shilman et al. | |
| 2010/0106705 A1* | 4/2010 | Rush | G06F 8/36 707/723 |
| 2010/0121857 A1 | 5/2010 | Elmore et al. | |
| 2010/0122233 A1 | 5/2010 | Rath et al. | |
| 2010/0174670 A1 | 7/2010 | Malik et al. | |
| 2010/0205198 A1 | 8/2010 | Mishne et al. | |
| 2010/0205663 A1 | 8/2010 | Ward et al. | |
| 2010/0262454 A1 | 10/2010 | Sommer et al. | |
| 2011/0231817 A1 | 9/2011 | Hadar et al. | |
| 2012/0143879 A1 | 6/2012 | Stoitsev | |
| 2012/0259882 A1 | 10/2012 | Thakur et al. | |
| 2012/0278064 A1 | 11/2012 | Leary et al. | |
| 2013/0103662 A1 | 4/2013 | Epstein | |
| 2013/0117254 A1 | 5/2013 | Manuel-Devadoss et al. | |
| 2013/0254744 A1 | 9/2013 | Sahoo et al. | |
| 2013/0326469 A1* | 12/2013 | Fox | G06F 8/71 717/101 |
| 2014/0040238 A1 | 2/2014 | Scott et al. | |
| 2014/0075414 A1 | 3/2014 | Fox et al. | |
| 2014/0122182 A1 | 5/2014 | Cherusseri et al. | |
| 2014/0149894 A1 | 5/2014 | Watanabe et al. | |
| 2014/0163959 A1 | 6/2014 | Hebert et al. | |
| 2014/0188746 A1 | 7/2014 | Li | |
| 2014/0297476 A1 | 10/2014 | Wang et al. | |
| 2014/0331200 A1 | 11/2014 | Wadhwani et al. | |
| 2014/0337355 A1 | 11/2014 | Heinze | |
| 2015/0127567 A1 | 5/2015 | Menon et al. | |
| 2015/0220608 A1 | 8/2015 | Crestani Campos et al. | |
| 2015/0331866 A1 | 11/2015 | Shen et al. | |
| 2015/0378692 A1 | 12/2015 | Dang et al. | |
| 2016/0253688 A1 | 9/2016 | Nielsen et al. | |
| 2016/0350105 A1 | 12/2016 | Kumar et al. | |
| 2016/0378618 A1 | 12/2016 | Cmielowski et al. | |
| 2017/0034023 A1 | 2/2017 | Nickolov et al. | |
| 2017/0063776 A1 | 3/2017 | Nigul | |
| 2017/0154543 A1 | 6/2017 | King et al. | |
| 2017/0177318 A1 | 6/2017 | Mark et al. | |
| 2017/0220633 A1 | 8/2017 | Porath et al. | |
| 2017/0242892 A1 | 8/2017 | Ali et al. | |
| 2017/0286541 A1 | 10/2017 | Mosley et al. | |
| 2017/0286548 A1 | 10/2017 | De et al. | |
| 2017/0344556 A1 | 11/2017 | Wu et al. | |
| 2018/0046609 A1 | 2/2018 | Agarwal et al. | |
| 2018/0067836 A1 | 3/2018 | Apkon et al. | |
| 2018/0107983 A1 | 4/2018 | Tian et al. | |
| 2018/0114000 A1 | 4/2018 | Taylor | |
| 2018/0189055 A1 | 7/2018 | Dasgupta et al. | |
| 2018/0191599 A1 | 7/2018 | Balasubramanian et al. | |
| 2018/0329883 A1 | 11/2018 | Leidner et al. | |
| 2018/0349388 A1 | 12/2018 | Skiles et al. | |
| 2019/0229998 A1 | 7/2019 | Cattoni | |
| 2019/0278933 A1 | 9/2019 | Bendory et al. | |
| 2019/0286683 A1 | 9/2019 | Kittur et al. | |
| 2019/0294703 A1 | 9/2019 | Bolin et al. | |
| 2019/0303141 A1 | 10/2019 | Li et al. | |
| 2019/0311044 A1 | 10/2019 | Xu et al. | |
| 2019/0324981 A1 | 10/2019 | Counts et al. | |
| 2020/0097261 A1 | 3/2020 | Smith et al. | |
| 2020/0110839 A1 | 4/2020 | Wang et al. | |
| 2020/0125482 A1 | 4/2020 | Smith et al. | |
| 2020/0133830 A1 | 4/2020 | Sharma et al. | |
| 2020/0293354 A1 | 9/2020 | Song et al. | |
| 2020/0301672 A1 | 9/2020 | Li et al. | |
| 2020/0301908 A1 | 9/2020 | Frost et al. | |
| 2020/0348929 A1 | 11/2020 | Sousa et al. | |
| 2020/0356363 A1 | 11/2020 | Dewitt et al. | |
| 2021/0049091 A1 | 2/2021 | Hikawa et al. | |
| 2021/0065045 A1 | 3/2021 | Kummamuru et al. | |
| 2021/0073293 A1 | 3/2021 | Fenton et al. | |
| 2021/0081189 A1 | 3/2021 | Nucci et al. | |
| 2021/0081418 A1 | 3/2021 | Silveira et al. | |
| 2021/0141863 A1 | 5/2021 | Wu et al. | |
| 2021/0149658 A1 | 5/2021 | Cannon et al. | |
| 2021/0149668 A1 | 5/2021 | Gupta et al. | |

(56) References Cited

U.S. PATENT DOCUMENTS

| | | | |
|---|---|---|---|
| 2021/0256367 | A1 | 8/2021 | Mor et al. |
| 2021/0303989 | A1 | 9/2021 | Bird et al. |
| 2021/0349801 | A1 | 11/2021 | Rafey |
| 2021/0357210 | A1 | 11/2021 | Clement et al. |
| 2021/0382712 | A1 | 12/2021 | Richman et al. |
| 2021/0397418 | A1 | 12/2021 | Nikumb et al. |
| 2022/0012297 | A1 | 1/2022 | Basu et al. |
| 2022/0083577 | A1 | 3/2022 | Yoshida et al. |
| 2022/0107802 | A1 | 4/2022 | Rao et al. |
| 2022/0197916 | A1 | 6/2022 | Sarkar et al. |
| 2022/0215068 | A1 | 7/2022 | Kittur et al. |
| 2023/0308700 | A1 | 9/2023 | Perez |

FOREIGN PATENT DOCUMENTS

| | | |
|---|---|---|
| WO | WO-2007/013418 A1 | 2/2007 |
| WO | WO-2020/086773 A1 | 4/2020 |

OTHER PUBLICATIONS

M. Squire, "'Should We Move to Stack Overflow?' Measuring the Utility of Social Mediafor Developer Support," 2015 IEEE/ACM 37th IEEE International Conferenceon Software Engineering, Florence, Italy, 2015, pp. 219-228, doi: 10.1109/ICSE. 2015.150. (Year: 2015).*

Iderli Souza, An Analysis of Automated Code Inspection Tools for PHP Available on Github Marketplace, Sep. 2021, pp. 10-17 (Year: 2021).

Khatri et al, "Validation of Patient Headache Care Education System (PHCES) Using a Software Reuse Reference Model", Journal of System Architecture, pp. 157-162 (Year: 2001).

Lotter et al, "Code Reuse in Stack Overflow and Popular Open Source Java Projects", IEEE, pp. 141-150 (Year: 2018).

Rothenberger et al, "Strategies for Software Reuse: A Principal Component Analysis of Reuse Practices", IEEE, pp. 825-837 (Year:2003).

Tung et al, "A Framework of Code Reuse in Open Source Software", ACM, pp. 1-6 (Year: 2014).

Lampropoulos et al, "REACT—A Process for Improving Open-Source Software Reuse", IEEE, pp. 251-254 (Year: 2018).

Leclair et al., "A Neural Model for Generating Natural Language Summaries of Program Subroutines," Collin McMillan, Dept. of Computer Science and Engineering, University of Notre Dame Notre Dame, IN, USA, Feb. 5, 2019.

Schweik et al, Proceedings of the OSS 2011 Doctoral Consortium, Oct. 5, 2011, Salvador, Brazil, pp. 1-100, Http:/Avorks.bepress.com/charles_schweik/20 (Year: 2011).

Stanciulescu et al, "Forked and Integrated Variants in an Open-Source Firmware Project", IEEE, pp. 151-160 (Year: 2015).

Zaimi et al, ":An Empirical Study on the Reuse of Third-Party Libraries in Open-Source Software Development", ACM, pp. 1-8 (Year: 2015).

Andreas DAutovic, "Automatic Assessment of Software Documentation Quality", published by IEEE, ASE 2011, Lawrence, KS, USA, pp. 665-669, (Year: 2011).

Chung-Yang et al. "Toward Since-Source of Software Project Documented Contents: A Preliminary Study", [Online], [Retrieve from Internet on Sep. 28, 2024], https://www.proquest.com/openview/c15dc8b34c7da061fd3ea39f1875d8e9/1?pq-origsite=gscholar&cbl=237699 (Year: 2011).

* cited by examiner

METHODS AND SYSTEMS FOR CREATING SOFTWARE ECOSYSTEM ACTIVITY SCORE FROM MULTIPLE SOURCES

CROSS-REFERENCE TO RELATED PATENT APPLICATION

This application claims the benefit of and priority to U.S. Provisional Patent Application No. 63/154,362 filed Feb. 26, 2021, the entire disclosure of which is incorporated by reference herein.

TECHNICAL FIELD

The present disclosure relates to methods and systems for scoring software components based on their ecosystem activity which can be used to understand their level of maturity and the available support from different contributors.

BACKGROUND

The adoption of open-source projects and cloud-based applications into enterprises has been increasing over the past few years. Along with the increasing adoption, there are few hindrances faced while choosing open-source libraries for their projects. One of the critical aspects of open source is the risk of its active maintenance and available support. Users of the open-source projects are concerned about the project's active releases, security updates, defect/bug fixes, general quick responses to their questions on the software usage, troubleshooting based on compatibility and changing standards, and problems faced while implementing the open-source library in their projects. Some examples in the same field and some of their shortcomings are described below.

U.S. Pat. No. 8,010,539 discloses a method, a system, and a computer product for generating a snippet for an entity, wherein each snippet comprises a plurality of sentiments about the entity. One or more textual reviews associated with the entity is selected. A plurality of sentiment phrases is identified based on the one or more textual reviews, wherein each sentiment phrase comprises a sentiment about the entity. One or more sentiment phrases from the plurality of sentiment phrases are selected to generate a snippet. Therefore, this disclosure teaches about generating snippets and extracting entities from text. However, this disclosure is silent on calculation of sentiment scores based on change trends during the last X time and regarding detecting positive, negative and neutral sentiments for scoring. This disclosure teaches analysis based on reviews but is silent on question and answer (Q&A) forum content regarding a particular Software library with contexts entirely related to the Software Engineering domain.

U.S. Pat. No. 8,417,713 discloses a method, a system and a computer program product for ranking reviewable entities based on sentiment expressed about the entities. A plurality of review texts is identified wherein each review text references an entity. A plurality of sentiment scores associated with the plurality of review texts are generated, wherein each sentiment score for a review text indicates a sentiment directed to the entity referenced by the review text. A plurality of ranking scores for the plurality of entities are generated wherein each ranking score is based at least in part on one or more sentiment scores associated with one or more review texts referencing the entity. A plurality of search results associated with the plurality of entities are displayed based at least in part on the ranking scores. Therefore, this disclosure teaches regarding ranking of a particular entity but is silent on identifying sentiments and scoring the same for a particular software library. This disclosure teaches about review of texts but is silent on gathering text from Q&A forums (Q,A,Comments) which are primarily regarding a particular Software library with contexts entirely related to the Software Engineering domain. This disclosure does not disclose on fetching texts from different forums and subjecting the same to Sentiment analysis through an automated setup.

U.S. Pat. No. 8,463,595 discloses performing detailed sentiment analysis that includes generating a first sentiment score for a first entity based on a content source. The first sentiment score is generated with respect to a first dimension. A second sentiment score for the first entity is generated based on the content source. The second sentiment score is generated with respect to a second dimension. Therefore, this disclosure teaches on calculation of sentiment score based on different dimensions and aggregating them. This disclosure is silent on scoring based on change in trends during the last X time period.

U.S. Patent Application Publication No. 2009/0319342A1 discloses regarding documents that are collected from a variety of publicly available sources that contain product data including product reviews, product specifications, price information and the like. Snippets of text obtained from the documents are analyzed for relevance, sentiment, credibility, and other aspects that help evaluate the quality of a product. Feature vectors are computed for snippets to analyze relevance, sentiment, or credibility. Statistical analysis is performed on the feature vectors to estimate a measure of the relevance, sentiment, or credibility. Factors associated with various snippets are aggregated to compute a quality score for a product or a particular aspect of product including product features, attributes, usages, or user personas. Information is displayed on a user interface that allows the user to examine the details relevant to computation of the quality score. Therefore, this disclosure teaches on conducting sentiment analysis on products and reviews, but silent on gathering data from Q&A forum content regarding a particular software library, fetching texts from these forums for sentiment analysis through an automated setup, etc.

U.S. Pat. No. 9,330,174 discloses a computer-implemented method that includes the actions of receiving a request for data indicative of topics of interest for a user segment of a social networking platform, accessing user data for one or more users of the social networking platform, comparing the one or more user characteristics that are associated with the user segment to user characteristics associated with the accessed user data, identifying, based on comparing, a portion of the accessed user data that pertains to the user segment, analyzing contents of the portion of the accessed user data that pertains to the user segment, determining, based on analyzing, one or more elements in the portion of the accessed user data that pertain to a topic of interest for the user segment, and transmitting, to a client device that sent the request, data indicative of elements pertaining to the topics of interest for the user segment. Therefore, this disclosure teaches on creating happiness score for users based on the sentiment of the posts they post. Predominantly, this is concentrated on creating scores for the users and is silent on analyzing sentiments with respect to a specific software entity and not regarding the sentiment of the users.

U.S. Patent Application Publication No. 2017/0286541A1 discloses a computing system configured to gather social media content includes a memory; a content collection and ingestion system, stored in the memory and configured, when executed on a computer processor, to communicate with one or more computing systems to direct a search of a content source using a received collection to request and to ingest the results of the directed search into a data store; and a content management system, stored in the memory and configured, when executed on a computer processor, to display the ingested results on a display. Therefore, this disclosure teaches on a Sentiment analysis that involves analyzing sentiments both manually and automatically after which suitable key phrases are extracted and then scored by the users using a GUI but is silent on analyzing sentiments and scoring them as well.

U.S. Patent Application Publication No. 2012/0278064A1 discloses a system and method for determining sentiment from user-generated text content is provided. A sentiment score is determined for one or more terms in a user-generated text content. A sentiment value is determined for the text content that is based at least in part on the sentiment score for the one or more terms. This disclosure teaches on identifying sentiments from texts using terms or pairs of terms in texts and associate it with a topic and provide score based on that but is silent on analyzing sentiments of text where the entire content of the text is considered and where the sentiments is aggregated for a particular post/thread.

U.S. Pat. No. 8,943,039 describes a system and method for modifying a parameter of a website to optimize an organic listing of the website at one or more search engines. Several embodiments include methods and systems for generating scored representations based upon different portions of data associated with a website, and then combining the scored representations to achieve a result. The result indicates a feature of the website that may be modified to optimize the organic ranking of the website at one or more search engines. Therefore, this disclosure focuses on only search engine optimization (SEO), Report generation and optimizing the website using different parameters for better ranking.

U.S. Pat. No. 9,135,665 describes a method and system are disclosed for providing syndicated commerce recommendations. A widget is configured to display a recommendation and is then embedded within a user interface (UI) window. Social data associated with a user is then processed to generate a recommendation object (e.g., a product, an offer, a deal, an advertisement, text, a video, an image, a URI, etc.), which is then displayed within the widget. This disclosure teaches on analyzing user behavior on social platforms and provide product/catalogue recommendations in the HTML, widgets based on the score of a user. This is a different use case.

U.S. Pat. No. 8,838,633 describes methods, systems, and techniques for providing sentiment analysis and for presenting the results of such analysis Example embodiments provide a Sentiment Analysis System (SAS), which provides tools to enable authors, programmers, users, developers, and the like to incorporate sentiment analysis into their content, such as into their web pages, and other web blogs or textual content. In one embodiment, the SAS provides a Sentiment Analysis Engine, an SAS API, and one or more user interface tools for presenting sentiment analysis. This disclosure teaches on extracting the relationship of entities and coming up with the positive or negative sentiment but is silent on analyzing sentiments of text where the entire content of the text is considered.

U.S. Patent Application Publication No. 2010/0121857A1 describes a set of data pertaining to artists and other content creators is retrieved periodically from various Internet-connected sources, the data being characterized as both quantitative and qualitative data. The data is analyzed through various means, including sentiment analysis, to produce quantitative information, including a score or set of scores, that is descriptive of an artist's popularity as well as the ranking of an artist among other artists within a category or set of categories. However, this disclosure is silent on gathering data from Q&A forum content regarding a particular software library, and fetching texts from these forums for sentiment analysis through an automated setup, etc.

U.S. Patent Application Publication No. 2016/0253688A1 describes a system and method for mining social media signals and cues i) created by a user (for example, a customer) and/or ii) to which the user is exposed (the "data"), and for processing that data as it relates to a service (including a fee or subscription-based service), in order to predict the user's predisposition or likelihood to either leave the subscription or the service or reduce his/her engagement with the subscription or the service. The analysis here is dependent on social media posts and contents but is silent on analysis based on Q&A forum content (Q,A,Comments) which are primarily regarding a particular software library with contexts entirely related to the software engineering domain.

U.S. Patent Application Publication No. 2010/0205663A1 describes a method for management, by way of gathering, storing, analyzing, tracking, sorting, determining the relevance of, visualizing, and responding to all available consumer generated media. Some examples of consumer generated media include web logs or "blogs", mobile phone blogs or "mo-blogs", forums, electronic discussion messages, Usenet, message boards, BBS emulating services, product review and discussion web sites, online retail sites that support customer comments, social networks, media repositories, and digital libraries. Any web hosted system for the persistent public storage of human commentary is a potential target for this method. The system is comprised of a coordinated software and hardware system designed to perform management, collection, storage, analysis, workflow, visualization, and response tasks upon this media. This system permits a unified interface to manage, target, and accelerate interactions within this space, facilitating public relations, marketing, advertising, consumer outreach, political debate, and other modes of directed discourse. This disclosure teaches regarding a scoring manager that provides the UI for the users to annotate topic and sentiment information stored in DB but is silent regarding a Scoring method that calculates individual scores and a final consolidated final ecosystem activity score.

U.S. Patent Application Publication No. 2010/0262454A1 describes sentimental significance of a group of historical documents related to a topic is assessed with respect to change in an extrinsic metric for the topic. A unique sentiment binding label is included to the content of actions documents that are determined to have sentimental significance and the group of documents is inserted into a historical document sentiment vector space for the topic. Action areas in the vector space are defined from the locations of action documents and singular sentiment vector is created that describes the cumulative action area. Newly published documents are sentiment-scored by semantically comparing them to documents in the space and/or to the singular sentiment vector. The sentiment scores for the newly published documents are supplemented by human sentiment assessment of the documents and a sentiment time decay factor is applied to the supplemented sentiment score of each newly published document. User queries are received, and a set of sentiment-ranked documents is returned with the highest age-adjusted sentiment scores. This disclosure deals with the sentiment assessments of documents which are used for responding to user queries but is silent on analysis of sentiments for posts and using the same for scoring. This disclosure also involves scoring of sentiments by a group of people and human assessment of them but is silent on automated analysis of Sentiments in a Q&A forum content (Q, A, Comments).

SUMMARY

The following presents a simplified summary of the subject matter in order to provide a basic understanding of some of the aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

A system for ecosystem activity scoring is disclosed herein. The system comprises at least one processor that operates under control of a stored program comprising a sequence of program instructions to control one or more components that are described herein. A project information portal to submit requests for generating an ecosystem activity score. A scoring system in communication with the project information portal to calculate individual scores and to calculate a final consolidated final ecosystem activity score. A batch system in communication with the scoring system for executing different long running software project data fetching information tasks and other services. A popularity rating service in communication with the batch system for calculating popularity of the software project. A releases rating service in communication with the popularity rating service for calculating a project activity score of the software project.

A forks rating service in communication with the releases rating service for evaluating forks data of forks to calculate the project activity of the software project. A defects rating service in communication with the forks rating service for calculating a defect score. A Q&A rating service in communication with the defects rating service for evaluating posts on developer forums on the software project and providing a community score. A solution rating service in communication with the Q&A rating service for evaluating solutions provided as a response to queries on the software project and calculating a solution score. Finally, a data service in communication with the solution rating service for reading and writing data from different data sources.

In an embodiment, the project information portal, which is a web GUI portal that comprises a web form for accepting project details that include name, details of repository, remote location URL of the project, and user email details for sending notifications. In an embodiment, the scoring system is configured to start the process to calculate the different scores contributing to the ecosystem activity score. The scoring system is further configured to consolidate the individual scores into a single unified ecosystem activity score and use an importance weight for the individual scores when consolidating the individual scores into the ecosystem activity score. In an embodiment, the batch system is configured to act as a workflow system that executes and monitors the long running project data fetching information tasks for ecosystem activity scoring process and execute activities comprising gathering project related information from external systems and scoring activities.

In an embodiment, the popularity rating service is configured to retrieve measure of reviews, star ratings, stars for a given software project, compute a popularity score based on the retrieved measurements, and normalize the retrieved measurements to a system defined scale. In an embodiment, the releases rating service is configured to analyze project releases information and examines the trend of releases done in the past period, number of contributors to each release, contributors' activity in the repository. The releases rating service is further configured to compute the project activity score based on the trend of release frequency, recentness of last release, and trend of number of active contributors to the release. In an embodiment, the forks rating service is configured to fetch the project's different fork details, examine creation dates of the forks, activity of the forks, and compute a score for the fork's activity. In an embodiment, the defects rating service is configured to fetch the project's defects and issues over a period, examine when they were opened and when they were closed, and calculate a defect fixing score.

In an embodiment, the Q&A rating service is configured to fetch the data of questions, answers, comments, solutions, and posting user data, and apply algorithms to compute the different scores on the activity in the developer forum. In an embodiment, the solution rating service is configured to examine comments to the solutions proposed and the solutions that are marked as accepted and calculate quality of solutions provided as the response to the queries asked in the developer forum. In an embodiment, the data services are configured to provide different connectors to the different data sources of project information and provide database and file storage integration services for other processing services to fetch and write the data.

A method of automated creation of software ecosystem activity score is also disclosed herein. At least one processor is provided that operates under control of a stored program comprising a sequence of program instructions comprising a first step that states fetching of detailed information on a software project from source code repositories. A second step that states fetching of detailed information on the software project based on questions and answers from developer forums. A third step that states calculation of popularity score of the software project. A fourth step that states calculation of repository activity score of the software project. A fifth Step that states calculation of defect fixing score for the software project. A sixth step that states measurement of developer community forum activity score on the software project. A seventh step that states measurement of solution score in the developer forum for the software project. An eighth step that states measurement of sentiment of posts in the developer forum on the software project. A ninth step that states measurement of userbase score in the developer forum on the software project. Finally, a tenth step that states computation of a consolidated ecosystem.

One aspect is a system for automatically scoring ecosystem activity. The system includes one or more processors and memory storing instructions that, when executed by the one or more processors, cause the one or more processors to perform operations comprising receiving data from one or more repositories and one or more developer forums related to a software project, calculating a popularity score of the software project based on the received data, evaluating forks data of forks of the software project, calculating a project activity score of the software project based on the received data and the evaluated forks data, calculating a defect score based on the received data, calculating a community score by evaluating posts of the one or more developer forums on the software project, calculating a solution score by evaluating solutions provided as a response to queries on the software project, calculating a sentiment score by aggregating and analyzing identified positive and negative sentiments, calculating a userbase score by evaluating metadata of user posts, reputation score, and trends in metadata of users; and calculating an ecosystem activity score based on one or more individual scores including the popularity score, the project activity score, the defect score, the community score, the solution score, sentiment score, or userbase score.

In some embodiments, the operations further includes accepting project details that include name, details of repository, remote location URL of the project, and user email details for sending notifications.

In some embodiments, the operations further includes calculating the ecosystem activity score based on weighting of the individual scores.

In some embodiments, the operations further includes periodically monitoring the software project; and gathering project related information from external systems and scoring activities.

In some embodiments, the operations further includes retrieving measures of reviews, star ratings, stars for a given software project; computing the popularity score based on the retrieved measurements; and normalizing the retrieved measurements to a predetermined scale.

In some embodiments, the operations further includes analyzing project releases information; examining a trend of releases from a predetermined period, number of contributors to each release, and contributors' activity for each release; and computing the project activity score based on the trend of release frequency, a recentness of last release, and a trend of number of active contributors to the release.

In some embodiments, the operations further includes fetching the software project's different fork details; examining creation dates of the forks and activity of the forks; and computing a fork score for the fork's activity.

In some embodiments, the operations further includes fetching the software project's issues over a period; examining when issue reports for the issues were opened and when they were closed; and calculating the defect fixing score.

In some embodiments, the operations further includes fetching data of questions, answers, comments, solutions, and posting user data; and computing the one or more scores on the activity in the developer forums.

In some embodiments, the operations further includes examining comments to the solutions proposed and the solutions that are marked as accepted; and calculating quality of solutions provided as the response to the queries asked in the developer forums.

In some embodiments, the operations further includes providing different connectors to the different data sources of project information; and providing database and file storage integration services for other processing services to fetch and write the data.

Another aspect is method of automated creation of software ecosystem activity score. The method includes receiving data from one or more repositories and one or more developer forums related to a software project; calculating a popularity score of the software project based on the received data; evaluating forks data of forks of the software project; calculating a project activity score of the software project based on the received data and the evaluated forks data; calculating a defect score based on the received data; calculating a community score by evaluating posts of the one or more developer forums on the software project; calculating a solution score by evaluating solutions provided as a response to queries on the software project; calculating a sentiment score by aggregating and analyzing identified positive and negative sentiments; calculating a userbase score by evaluating metadata of user posts, reputation score, and trends in metadata of users; and calculating an ecosystem activity score based on one or more individual scores including the popularity score, the project activity score, the defect score, the community score, the solution score, sentiment score, or userbase score.

In some embodiments, receiving data from the one or more repositories comprises: connecting to the source code repository; and receiving data on star ratings or stars, watchers' information, forks information, project releases, contributor information, pull requests for code submissions, bugs information, and issues information.

In some embodiments, receiving data from the one or more developer forums comprises: connecting to a developer forum site using provided API; and receiving data from the one or more developer forums including at least one of the questions posted for projects, comments, the answers to the questions, solutions provided, or posting user information.

In some embodiments, calculating the popularity score comprises: processing, via natural language processing, one or more of the ratings, reviews, or stars received by the software project; computing overall trend of the data over a predetermined period and factoring the overall trend in an overall calculation; and tagging the software projects based on the scores with qualifiers including one of ever popular, upcoming, or maintained.

In some embodiments, calculating the project activity score comprises: examining information on the project release over a defined period to understand a trend of frequency of the project releases; processing fork data of the software project, code changes data to determine number of changes, frequency, and trends of this information; and calculating the project activity score based on one or more of the processed fork data, or code changes data, the frequency, or the trends.

In some embodiments, calculating the defect score for the software project comprises: fetching issues related data including issue opened date, closed date, current open defects and issues, and severity information; analyzing a trend of the issues related data; and creating the defect fixing score based on the fetched issues related data.

In some embodiments, evaluating the posts of the one or more developer forums on the software project to provide the community score comprises: fetching developer forum data on the questions, the answers, and the comments posted related to the software project; consolidating the developer forum data of the questions, the answers and the comments over a period to determine trend and recentness of the posts related to the questions, answers and the comments for the software project; and computing a community activity score and saving the community activity score in a database.

In some embodiments, evaluating the solutions provided as a response to queries on the software project to provide the solution score comprises: fetching the answers with the solutions to the questions posted on the software project from the developer forum; and processing data on number of solutions provided, solutions which are accepted, comments on the solutions to examine the trends, availability of accepted solutions and nature of the comments on the solutions to create the solution score and saves the solution score to the database.

In some embodiments, the calculating the sentiment score comprises: fetching the questions, the answers and the comments on the questions, the answers, and the solutions in the developer forum for software project; and applying natural language processing techniques and machine learning classification techniques to classify data on the questions, the answers and the comments into sentiments of neutral, positive, and negative categories with appropriate scores.

In some embodiments, the calculating the userbase score comprises: identifying the users engaging in the developer forums by providing the questions, the answers, the comments and the solutions on the software project; getting activity of the user across the developer forum to tag expertise level of the user on the software project; analyzing the trends of the users providing the questions, the answers, the comments and the solutions over a period; calculating the userbase score with activity data of the user and the trend data.

In some embodiments, the computation of the ecosystem activity score comprises: fetching individual scores; and calculating the consolidated ecosystem activity score by adding the individual scores.

Another aspect is a computer program product for automated creation of software ecosystem activity score, comprising a processor and memory storing instructions thereon, wherein the instructions when executed by the processor cause the processor to: receive data from one or more repositories and one or more developer forums related to a software project; calculate a popularity score of the software project based on the received data; evaluate forks data of forks of the software project; calculate a project activity score of the software project based on the received data and the evaluated forks data; calculate a defect score based on the received data; calculate a community score by evaluating posts of the one or more developer forums on the software project; calculate a solution score by evaluating solutions provided as a response to queries on the software project; calculate a sentiment score by aggregating and analyzing identified positive and negative sentiments; calculate a userbase score by evaluating metadata of user posts, reputation score, and trends in metadata of users; and calculate an ecosystem activity score based on one or more individual scores including the popularity score, the project activity score, the defect score, the community score, the solution score, sentiment score, or userbase score.

BRIEF DESCRIPTION OF THE DRAWINGS

The following drawings are illustrative of particular examples for enabling systems and methods of the present disclosure, are descriptive of some of the methods and mechanism, and are not intended to limit the scope of the disclosure. The drawings are not to scale (unless so stated) and are intended for use in conjunction with the explanations in the following detailed description.

Figure 1:
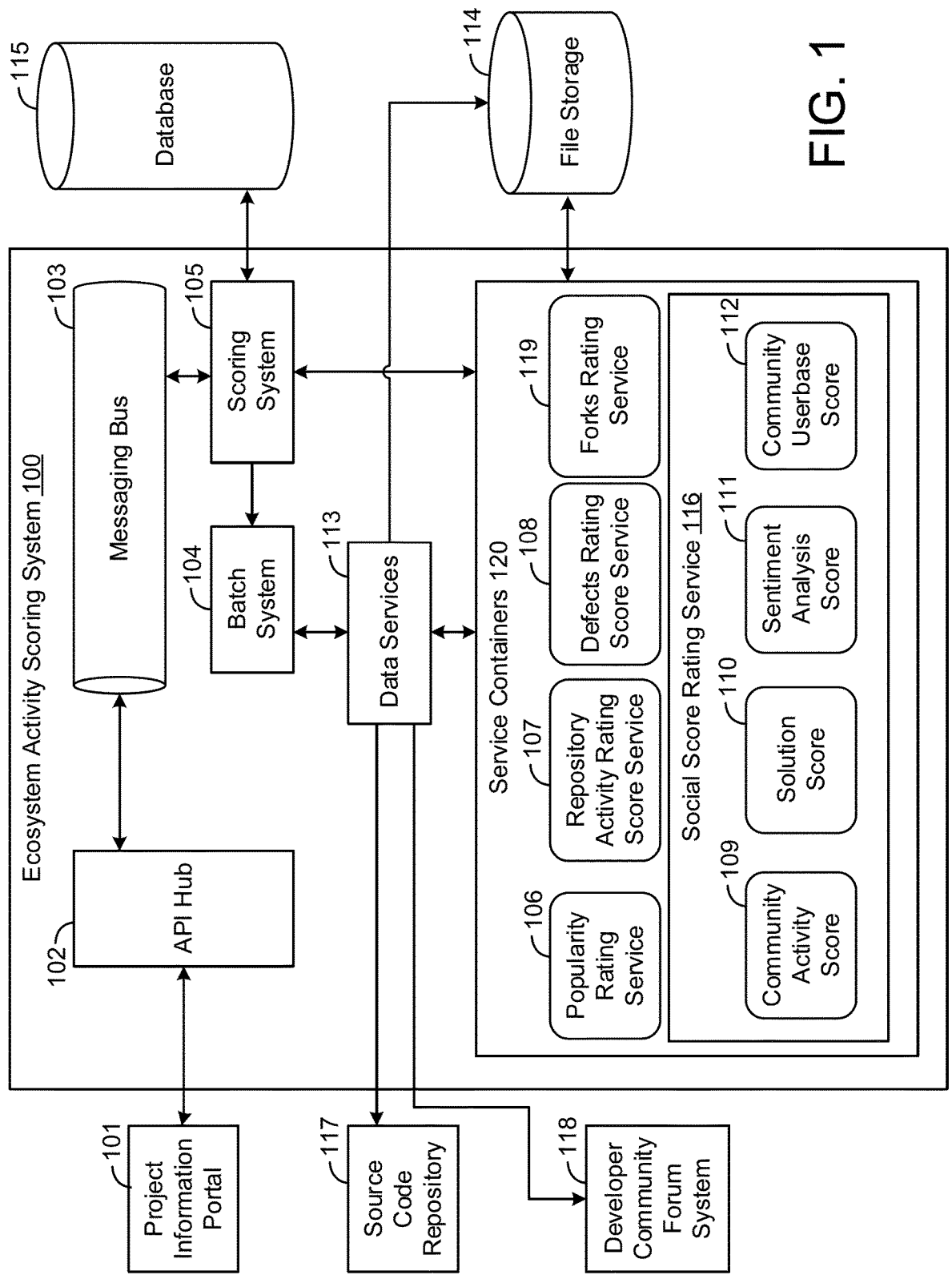
FIG. 1 shows a system architecture that creates the ecosystem activity score for open-source software projects, in accordance with some embodiments.

Persons skilled in the art will appreciate that elements in the figures are illustrated for simplicity and clarity and may represent both hardware and software components of the system. Further, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

Exemplary embodiments now will be described. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

In some embodiments, an ecosystem activity scoring system computes scores based on trends on community reviews, repository activity by forking, source code activity, project release trends, defects (or issues) fixing trends, contributors support, and community collaboration. The system may recommend the projects to help developers choose the software component based on its ecosystem activity score.

FIG. 1 shows a system 100 or a high-level architecture that scores the ecosystem activity for the open-source projects, in accordance with some embodiments. Briefly, and as described in further details below, the system 100 discloses an API Hub 102, Messaging Bus 103, Batch System 104, and Scoring System 105. The system 100 includes Service Containers 120 which include Popularity Rating Service 106, Repository Activity Rating Score Service 107, Defects Rating Score Service 108, and Social Score Rating Service 116. The Social Score Rating Service 116 includes Community Activity Score 109, Solution Score 110, Sentiment Analysis Score 111, and Community Userbase Score 112. The system 100 further includes or is connected to Data Services 113, File Storage 114, Database 115 and Project Information Portal 101, which are a unique set of components to perform the task of calculating the software ecosystem activity score. The Project Information Portal 101 allows users to submit requests for generating an ecosystem activity score. The Service Containers 120 may include additional services that are not shown in FIG. 1.

In the embodiment shown in FIG. 1, the Project Information Portal 101 has a User Interface form for a user to interface with the System 100 for submitting requests for knowing the ecosystem activity score of a given software project and viewing their status. The Project Information Portal 101 allows the user to submit requests to calculate the ecosystem activity score for one or more projects and view the generated results. The Project Information Portal 101 has a web form for the user to enter the project details such as project name, project depository details, notification email, and a submit button to raise the request to perform the ecosystem scoring analysis. Once submitted, the user can also view the status of the submitted request on the portal. The System 100 sends an email notification when the request is completed processing. The user can access the results from the status screen.

The submitted request through the web portal goes to the API Hub 102, which acts as a gateway for accepting all web service requests from the portal. The API Hub 102 hosts the web services for taking the requests and creating request messages into the Messaging Bus 103. The Messaging Bus 103 provides for event-driven architecture, enabling long-running processes such as the reuse scoring to be decoupled from requesting system calls. This decoupling helps the System 100 service the request and notify the user once the entire process of calculating the reuse score is completed. There are job listeners configured to listen to the messages in Messaging Bus 103. Different type of messages triggers different services. Batch System 104 acts as a workflow system that sequences the various activities required from fetching details from repositories, developer forums and calculating the scores. Therefore, the Batch System 104 acts as a workflow system that executes and monitors the long running project data fetching information tasks for the ecosystem activity scoring process. The Batch System 104 comprises the logic to sequence the tasks and addresses any exception scenarios while processing the different steps for the request. The Batch System 104 also executes activities comprising gathering project related information from external systems and scoring activities.

In some embodiments, the Scoring System 105 is in communication with the Project Information Portal 101 to calculate individual scores and to calculate a final consolidated final ecosystem activity score. The Scoring System 105 is the module that takes the request details from the Messaging Bus 103 and starts the process to calculate the different scores contributing to the ecosystem activity score. The Scoring System 105 is in communication with the Batch System 104 for executing different long running software project data fetching information tasks and other services. The Scoring System 105 initiates the various tasks in the Batch System 104 as these are long-running tasks. Batch System 104 executes the activities to get the project details from different sources. It brings the project's data from a Source Code Repository 117 and stores it in Database 115 and File Storage 114. The preliminary data includes star ratings or stars, watchers, forks, project releases, contributors, pull requests for code submissions, bugs information, and issues information. Batch System 104 brings in the data from developer forums (e.g., in the Developer Community Forum System 118), including the questions posted for those projects, the comments, answers to the questions, solutions provided, user information.

In some embodiments, the Scoring System 105 is configured to start the process to calculate the different scores contributing to the ecosystem activity score. In some embodiments, the Scoring System 105 is configured to consolidate the individual scores into a single unified ecosystem activity score and use an importance weight for the individual scores when consolidating the individual scores into the ecosystem activity score. Once all the individual scores are calculated, the Scoring System 105 consolidates them to create a unified ecosystem activity score. Once all the project-related information is collected, the Scoring System 105 calls the individual services to calculate the individual scores.

The Popularity Rating Service 106 is in communication with the Batch System 104 for calculating popularity of the software project. The Popularity Rating Service 106 retrieves the measure of reviews, star ratings, stars for the given project and computes the popularity score based on these values, normalizes it to a system-defined scale, and stores it in the Database 115. In some embodiments, a Releases Rating Service or the Repository Activity Rating Score Service 107 is also disclosed which is in communication with the Popularity Rating Service 106 for calculating a project activity score of the software project. The project activity score is computed based on the trend of release frequency, recentness of last release, and trend of number of active contributors to the release. In some embodiments, a Forks Rating Service 119 is in communication with the Repository Activity Rating Score Service 107 for evaluating forks data of forks to calculate the project activity of the software project. The Forks Rating Service 119 is further configured to fetch the project's different fork details, examine creation dates of the forks, activity of the forks, and compute a score for the fork's activity.

The Repository Activity Rating Score Service 107 or the releases rating service takes the project releases information and examines the trends of releases done in the past period, number of contributors to each release, and contributors' activity in the repository. Based on the trend of release frequency, recentness of the last release, and trend of the number of active contributors to the release, the project activity score is computed and stored in the Database 115.

The Defects Rating Score Service 108 is responsible for calculating a defect fixing score for the project. It fetches the project's defects and issues (or bugs) over a period and examines when issue reports were opened, reopened, and closed. The defects refer to the bugs in the project, and the issues can refer to an enhancement request or issue in project operations. The Defects Rating Score Service 108 is in communication with the Forks Rating Service 119 for calculating a defect score. In an embodiment, a Q&A Rating Service in communication with the Defects Rating Score Service 108 for evaluating posts on developer forums on the software project and providing a community score. In some embodiments, a Solution Rating Service in communication with the Q&A Rating Service for evaluating solutions provided as a response to queries on the software project and calculating a solution score. The Q&A rating service is configured to fetch the data of questions, answers, comments, solutions, and posting user data, and apply algorithms to compute the different scores on the activity in the developer forum.

The Social Score Rating Service 116 provides a resulting score by measuring the Community Activity Score 109 on the software project, measuring the Solution Score 110, measuring the Sentiment Analysis Score 111 by analyzing the posts in the developer community forum on the software project and measuring the Community Userbase Score 112 in the developer forum on the software project. Finally, the Social Score is calculated by summing all the above measured scores.

The Data Services 113 provides the different connectors to the different sources of information and the internal system databases. The sources will require different integrations components including web services, database protocol-based integrations to fetch the different information. The Data Services 113 is in communication with the Solution Rating Service for reading and writing data from different data sources. The Solution Rating Service is also configured to examine comments to the solutions proposed and the solutions that are marked as accepted and calculate quality of solutions provided as the response to the queries asked in the developer forum. The Data Services 113 is also configured to provide different connectors to the different data sources of project information and provide database and file storage integration services for other processing services to fetch and write the data.

Figure 2:
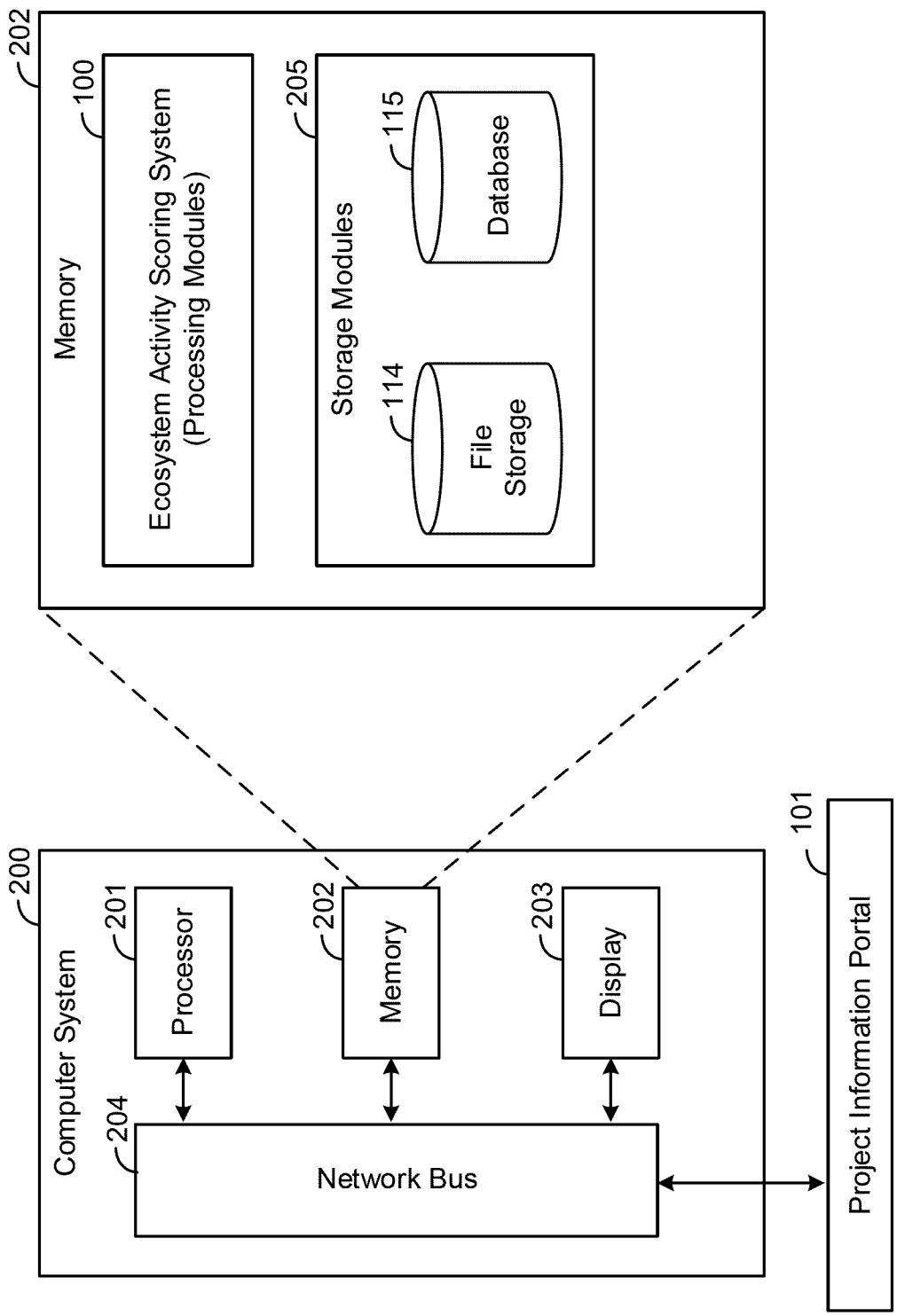
FIG. 2 shows an example computer system implementation for creating the ecosystem activity score for open-source software projects, in accordance with some embodiments.

FIG. 2 shows a block view of the computer system 200 for calculating the ecosystem activity scores of software components, in accordance with some embodiments. This may include a Processor 201, Memory 202, Display 203, Network Bus 204, and other input/output like a microphone, speaker, wireless card etc. The processing modules of the Ecosystem Activity Scoring System 100, File Storage 114, Database 115, are stored in the Memory 202 which provides the necessary machine instructions to the Processor 201 to perform the executions for calculating the ecosystem activity Scoring. In some embodiments, the Processor 201 controls the overall operation of the system and managing the communication between the components through the Network Bus 204. The Memory 202 holds the ecosystem code, data, and instructions of the System 100 and one or more types of the non-volatile memory and volatile memory. The Project Information Portal 101 interacts via the Network Bus 204. In some embodiments, the Processor 201 and the Memory 202 form a processing circuit configured to perform the various functions and processes described throughout the present disclosure.

Figure 3:
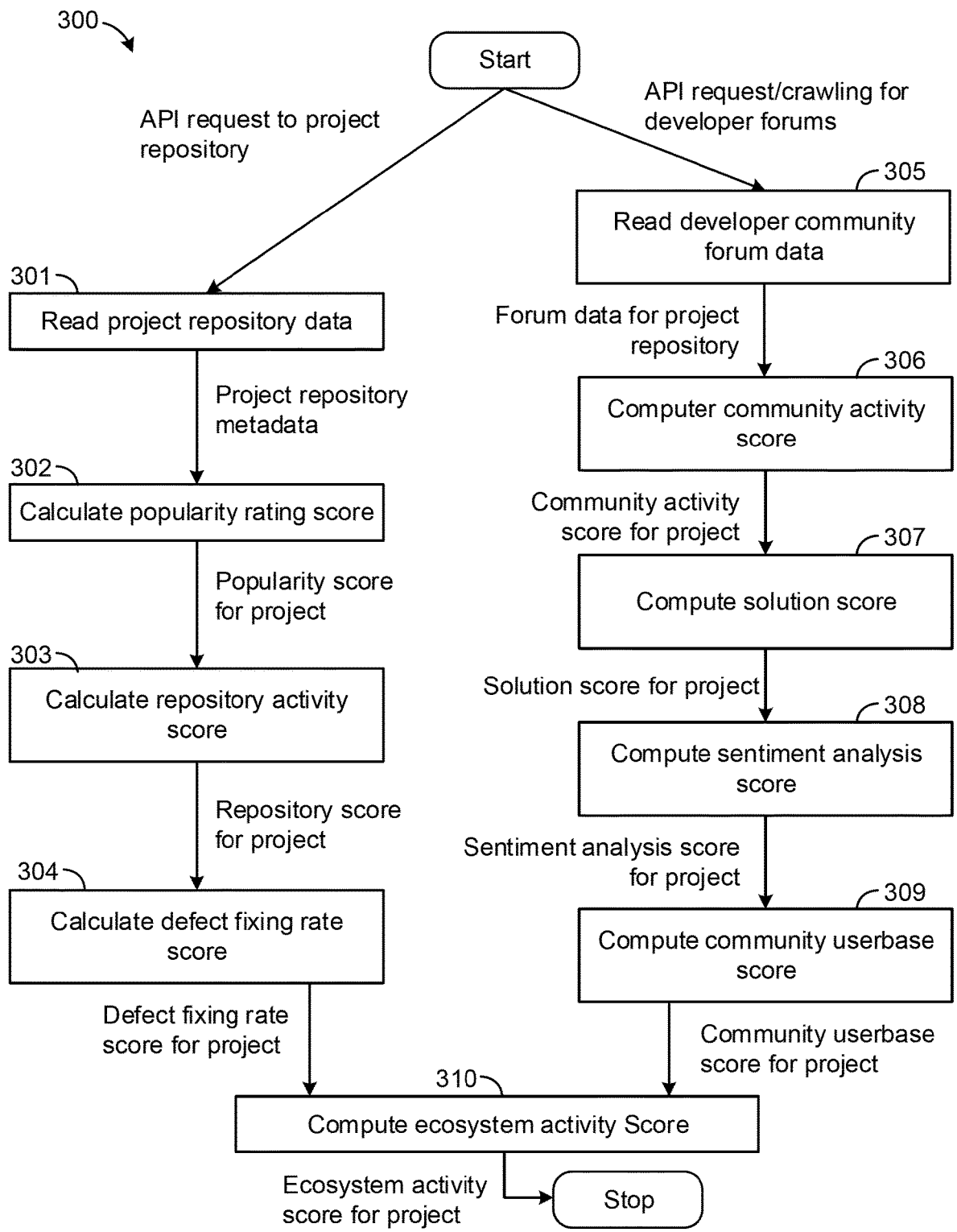
FIG. 3 shows the overall process flow for a request to generate the ecosystem activity score for the open-source projects, in accordance with some embodiments.

FIG. 3 shows an overall process 300 for creating the software ecosystem activity score, in accordance with some embodiments. The process 300 of generating the ecosystem activity score includes data from two broad dimensions. One is the data from the project repositories and the other is the data from developer forums. These two dimensions provide the data for the subsequent processes to use in their processing steps. Accordingly, process 300 splits into two branches. The first branch (e.g., first dimension) involves the steps from 301 to 304. The second branch (e.g., second dimension) involves steps from 305 to 309. The two branches may be executed in parallel, in series, or any other order.

In the first branch, in the step 301, the data from the project repository related to the software project activity is read and stored. The data includes information on star ratings or stars, watchers' information, forks information, project releases, contributor information, pull requests for code submissions, bugs information, issues/defects information. All the project data obtained in the step 301 are used further in subsequent steps to calculate the Popularity Score in step 302, to calculate the Repository Activity Score in step 303, and to calculate the Defect Fixing Rate Score in step 304. Step 310 of computing the ecosystem activity score is based on the calculated individual scores. In this disclosure, "reading" may be synonymously used as retrieving data from a source (e.g., repository, forums, etc.) and executing natural language processing to interpret the text so as to perform further processing.

In the second branch, in step 305, the Q&A data from developer community systems and developer forums related to the software project are fetched, read, and stored. This data includes the questions posted for those projects, the comments, answers to the questions, solutions provided, posting user information and activity in the forum. All the forum data regarding the project obtained in the step 305 are used further in subsequent steps to compute the Community Activity Score in step 306, to compute the Solution Score in step 307, to compute the Sentiment Analysis Score in step 308, and to compute the Community Userbase Score in the step 309. In step 310, the Ecosystem Activity Score is computed based on the individually computed scores from steps 301-309 to obtain the Ecosystem Activity Score for the project.

Figure 4:
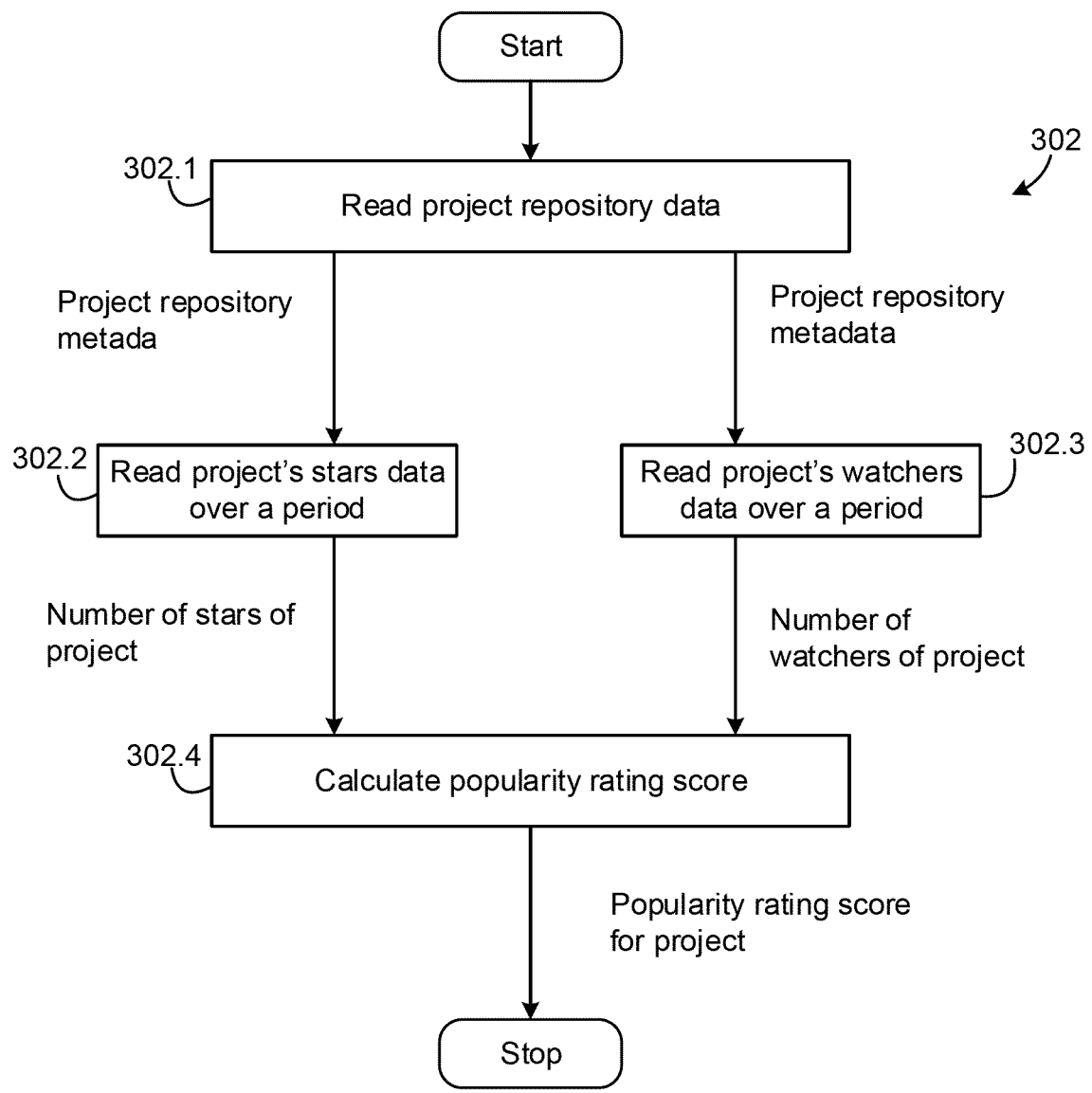
FIG. 4 shows the steps to calculate the popularity rating score for the open-source projects, in accordance with some embodiments.

FIG. 4 shows a detailed view of step 302, where the open-source software project's popularity rating score is calculated based on the ratings, reviews, stars it has received, in accordance with some embodiments. The System 100 computes the overall trend of these data over a period and factors it in the overall calculation. It not only takes the cumulative values but factors the trends also accounting the past and current popularity standing's changes in the future. Based on these scores, the software projects are tagged with qualifiers such as "ever popular," which are software projects that have all time high on stars, watchers, trends among the repositories over any period. It is tagged as ever popular based on number of users using the software project, comments, frequency of usage of the software project. "Upcoming" software projects that have increase in stars and watchers over a period are tagged as upcoming based on increased activity, recentness, and relevancy of number of users using the software project, increased number of questions, answers and comments, sudden increase in the usage of the software project. "Maintained" software projects that have consistent stars, watchers, trends among the repositories over any period are tagged as maintained based on consistency of number of users using the software project, consistent number of questions, answers and comments, frequent and consistent increase in the usage of the software project.

Steps involved in calculating the Popularity Rating Score are as follows. In step 302.1, the project repository data obtained from step 301 is collected, read, and stored in the Database 115 for an open-source software project. The project repositories have set of event API pre-configured. The Popularity Rating Service 106 polls at predefined intervals to call event APIs. Intervals of polling can be configured. These event APIs return data about the changes or differences on increase in stars or watchers occurred during the intervals. The Popularity Rating Service 106 receives these data and verifies whether any events has occurred during that interval. If the Popularity Rating Service 106, finds any event updates, the Popularity Rating Service 106 triggers a call to receive the details of the event—the changes or differences on increase in stars or watchers during these intervals. The data received from the project repository from these events are stored in the Database 115. The data is segregated based on the pre-defined data range of the stars and watchers and scores are recomputed. The repository data thus obtained from the step 302.1 is used in the subsequent steps to read the project's stars data over a period in step 302.2 and to read the project's watchers data over a period in step 302.3 which results in identifying the number of stars of the project over a period and number of watchers of the project over a period, respectively. The data received from steps 302.2 and 302.3 are used to calculate the Popularity Score in step 302.4. After the segregation based on the ranges, logarithmic with base 10 is applied over the data received (number of stars and watchers over that interval) for calculating the popularity score with accuracy and efficiency. Based on the determination of number of stars and number of watchers for an open-source software project over logarithmic with base 10, the popularity rating score is computed in step 302.4. The popularity rating score is computed using a formula.

The parameters considered for the formula of popularity rating score are logarithm with base 10 of number of stars given to an open-source software project over a period, logarithm with base 10 of number of watchers for an open-source software project over a period. Period can be in days, weeks, months or years. An example for calculating the popularity score is provided below:

$$\text{Popularity Rating Score} = \log_{10}(\text{Number of Stars given to an open-source software project in } X) + \log_{10}(\text{Number of Watchers for an open-source software project in } X),$$

where X=Number of Days, Weeks, Months or Years.

Figure 5:
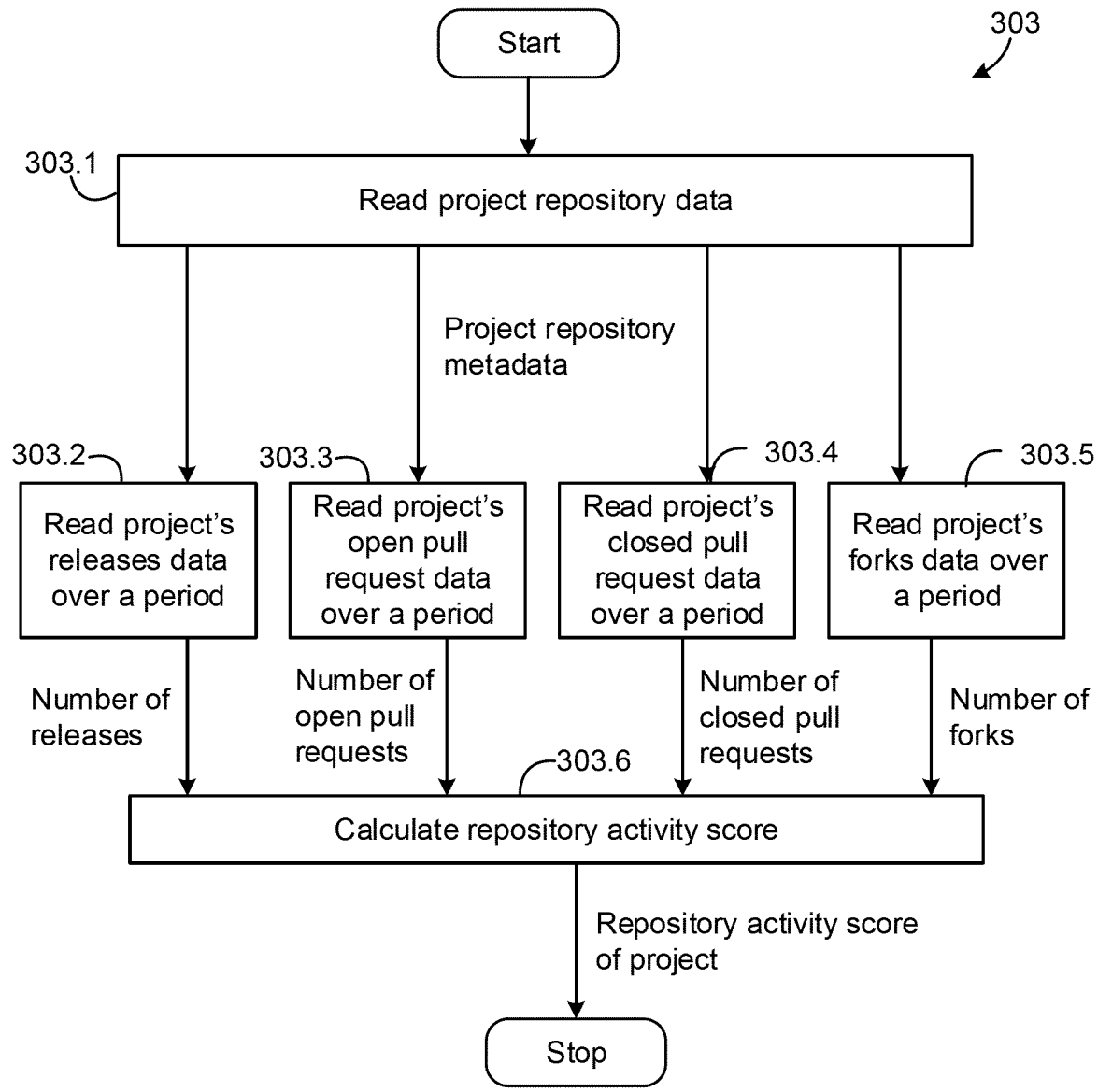
FIG. 5 shows the steps to calculate the repository activity score for the open-source projects, in accordance with some embodiments.

FIG. 5 shows a detailed view of step 303, where the score indicating the scale of activities in the project is calculated, in accordance with some embodiments. The project's release information over a defined period is examined to understand the trend of release frequencies. The System 100 then processes the project's fork data, code changes data to determine the number of changes, frequency, and trends of these information. These scores and trend data is used to calculate the overall repo activity score and is stored in the database.

Steps involved in calculating the repository activity score are as follows. The project repository data obtained from the step 301 is collected, read, and stored in the Database 115 for an open-source software project in step 303.1. The project repositories have set of event API pre-configured. Repository Activity Score Service 107 polls at predefined intervals to call these event APIs. Intervals of polling can be configured. These event APIs returns data about the changes or differences in number of releases, number of open, closed pull request, number of forks occurred during the intervals. The Repository Activity Score Service 107 receives these data and verifies whether any events have occurred during that interval. If it finds any event updates, the Repository Activity Score Service 107 triggers a call to receive the details of the event—the changes or differences on number of releases, number of open, closed pull request and number of forks for an open-source software project during these intervals. The data received from the project repository from these events are stored in the Database 115. The repository data thus obtained from step 302.1 is used in the subsequent steps to calculate repository activity score. The data is segregated based on the pre-defined data range of the releases, open pull request, closed pull request, and forks, and respective scores are recomputed in steps 303.2, 303.3, 303.4, and 303.5 respectively.

The project releases data from over a period are read in step 303.2, where the number of releases over a period are obtained. The number of open pull requests over a period are obtained by reading the project's open pull requests data in step 303.3. In step 303.4, the project's closed pull requests data over a period are read, where the number of closed pull requests over a period are obtained. In step 303.5, the number of forks over a period are obtained by reading the project forks data. After the segregation based on the ranges, logarithmic with base 10 is applied over the data received (number of releases, number of open, closed pull request and number of forks over the configured interval) for calculating the repository activity score with accuracy and efficiency. The data thus received in the steps of 303.2, 303.3, 303.4, 303.5 are used to calculate the repository activity score in step 303.6. Based on the determination of number of releases, number of open and closed pull request, and number of forks for an open-source software project over logarithmic with base 10, the repository activity score is computed in step 303.6. The repository activity score is computed using a formula.

The parameters considered for the formula of repository activity score are logarithm with base 10 of number of releases on an open-source software project, number of open and closed pull request on an open-source software project and number of forks for an open-source software project over a specific period. Period can be in days, weeks, months or years. An example of calculating the repository activity score is provided below:

$$\text{Repository Activity Score} = \log_{10}(\text{Number of Releases on an open-source software project over } X) + \log_{10}(\text{number of open pull requests over } X) + \log_{10}(\text{number of closed pullrequests over } X) + \log 10(\text{number of forks for an open-source software project over } X),$$

where X=Number of Days, Weeks, Months or Years.

Figure 6:
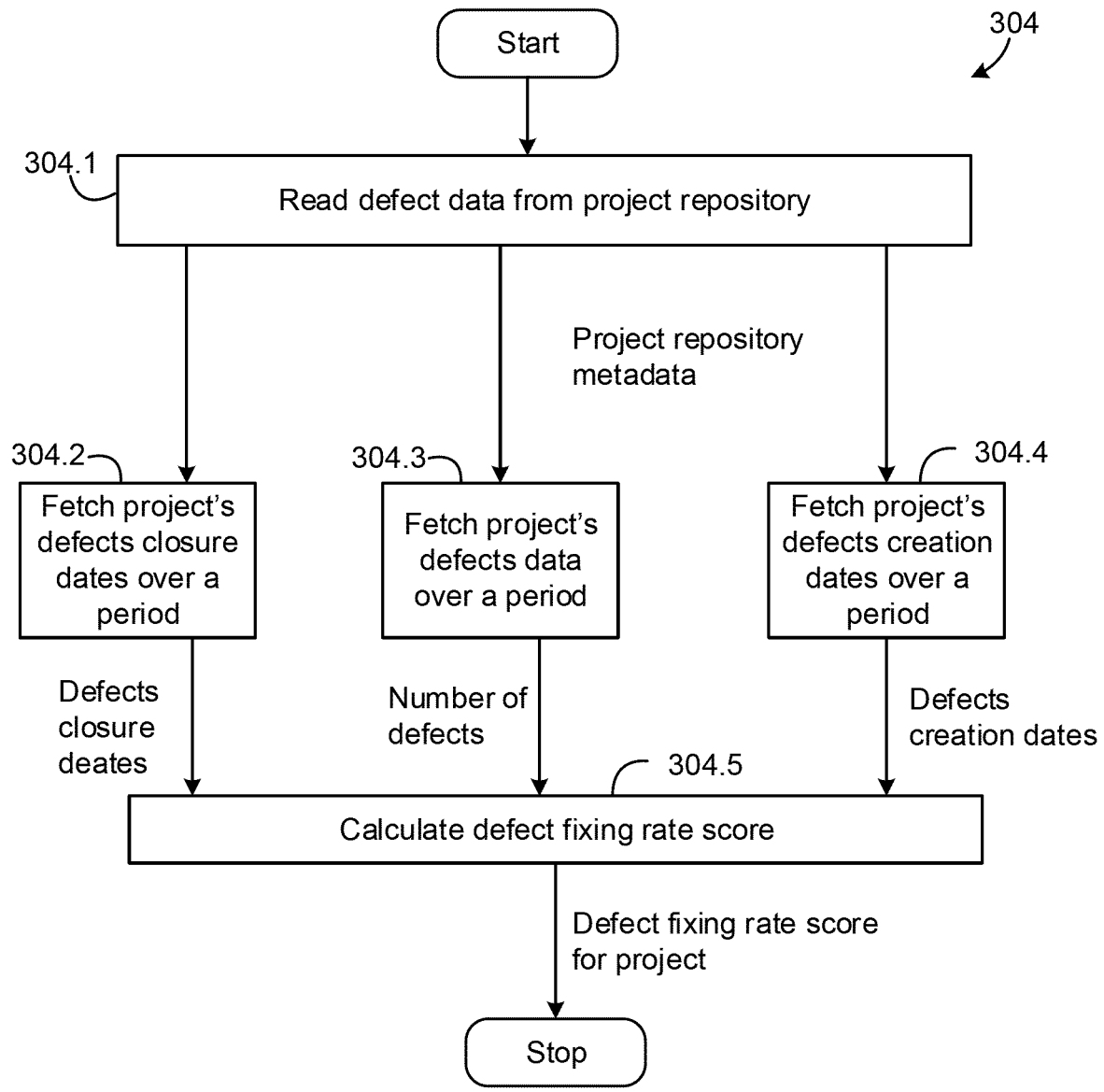
FIG. 6 shows the steps to calculate the defect fixing rate score for the open-source projects, in accordance with some embodiments.

FIG. 6, shows a detailed view of step 304, the system 100 calculates a score indicating how the responsive the project team and contributors are towards closing the issues and fixing the bugs raised for the open-source project, in accordance with some embodiments. In this step, the system fetches the defect and issues related data such as defect/issue opened date, closed date, current open defects/issues, and severity information. This information is used to create the defect fixing rate score.

Steps involved in steps 304 are as follows. The project repository data obtained from the step 301 is collected, read, and stored in Database 115 for an open-source software project in step 304.1. The project repositories have set of event API pre-configured. The Defect Rating Score Service 108 polls at predefined intervals to call these Event APIs. Intervals of polling can be configured. These event APIs returns data about the changes or differences in Total number of defects raised for an open-source software project, date of creation of the defect and date of closure of the defect occurred during the intervals. The Defect Rating Score Service 108 receives these data and verifies whether any events have occurred during that interval. If the Defects Rating Score Service 108, finds any event updates, the Defect Rating Score Service 108 triggers a call to receive the details of the event—the changes or differences on total number of defects, date of creation of the defect and date of closure of the defect for an open-source software project during these intervals. The data received from the project repository from these events are stored in the Database 115.

The repository defects data thus obtained from the step 304.1 is used in the subsequent steps 304.2, 304.3, 304.4 to calculate Defect Fixing Rate Score in the step 304.5. The data is segregated based on the pre-defined data range of the total number of defects, date of creation of the defect and date of closure of the defect and scores are recomputed. In the step 304.2, the defects closure dates in the project over a period is obtained. The number of defects data over a period is obtained in the subsequent step of 304.3. In the step 304.4, the defects creation dates in the project over a period is obtained. After the segregation based on the ranges, logarithmic with base 10 is applied over the data received (total number of defects, date of creation of the defect and date of closure of the defect over the configured interval) for calculating the defect fixing rate score with accuracy and efficiency. Based on the determination of total number of defects, date of creation of the defect and date of closure of the defect for an open-source software project, the defect fixing rate is computed in step 304.5. The defect fixing rate is computed using a formula.

In step 304.5, the parameters considered for the formula are total number of defects over a period raised for an open-source software project in step 304.3, date of creation of the defect during that period in step 304.2 and date of closure of the defect during that period in step 304.4. Period can be in days, weeks, months or years. An example for calculating the defect fixing rate score is provided below:

Defect Fixing Rate Score=Average of (Date of Closure of the defect for a software project in $X$–Date of Creation of the defect for a software project in $X$)/Total number of defects reported for a software in $X$, where X=Number of days, weeks, months or years.

Figure 7:
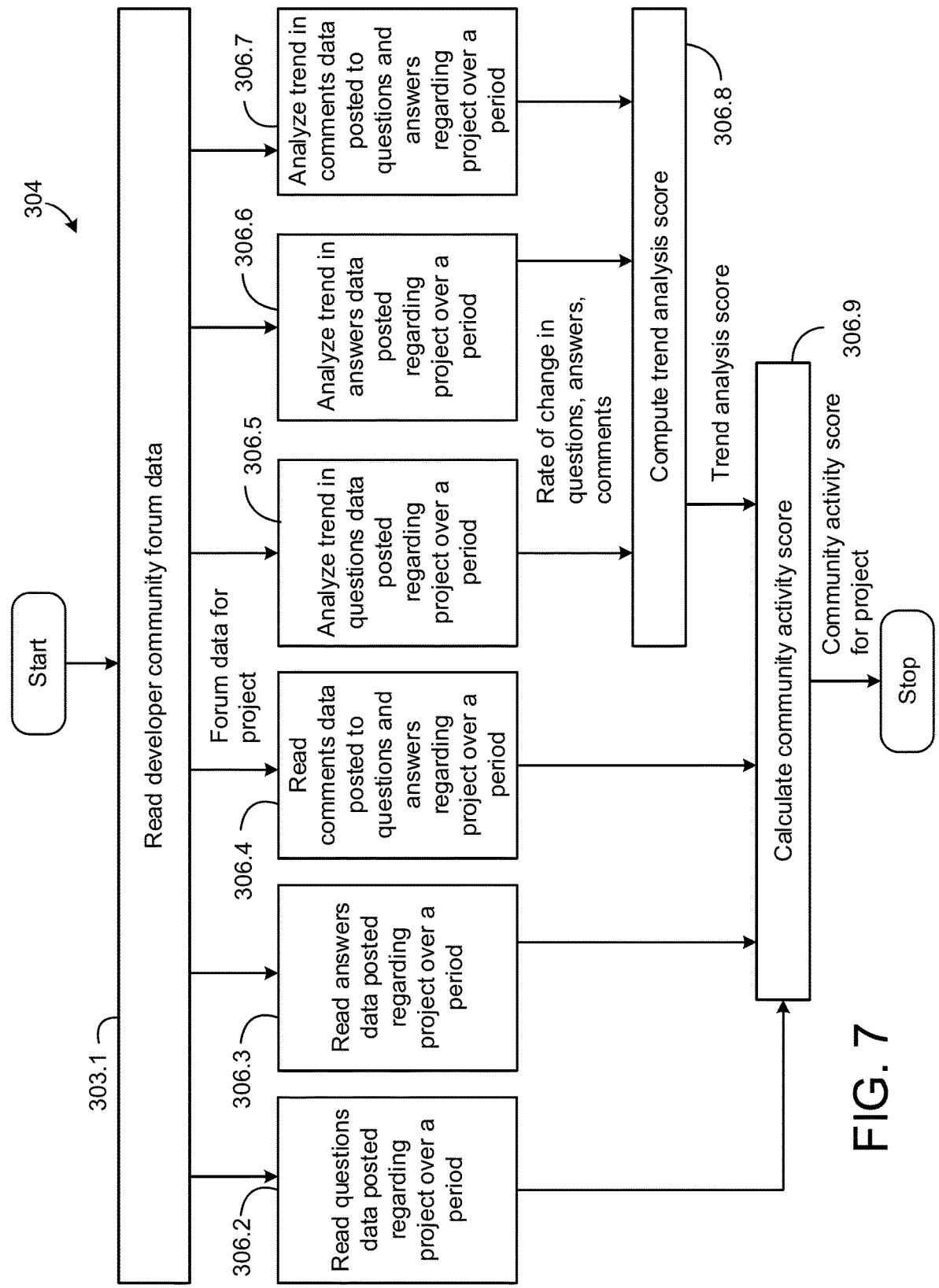
FIG. 7 shows the steps to calculate the community activity score for the open-source projects, in accordance with some embodiments.

FIG. 7 shows a detailed view of step 306, where the developer forum data on questions and answers posted related to the software project is used to calculate the community activity score, in accordance with some embodiments. The system 100 consolidates the data of questions and answers over a period to determine the trend and recentness of the question-and-answer posts for the software project. Based on this information, the system 100 computes the community activity score and saves it in the Database 115.

Steps involved in calculating the community activity score are as follows: The forum data for project obtained from the step 305 is collected, read, and stored in the Database 115 for an open-source software project in step 306.1. The forum data thus obtained from the step 306.1 is used in the subsequent steps to calculate community activity score. The project repositories and developer forums have set of event API pre-configured. Social Score Rating Service 116 polls at predefined intervals to call these Event APIs. Intervals of polling can be configured. These event APIs returns data about the project from the developer forums. In the step 306.2, questions data in the data of the step 306.1 are read to obtain number of questions posted related to a software project over a period. The number of answers posted over a period related to a software project is obtained in the step 306.3 by reading answers data in the data of the step 306.1. In the step 306.4, comments data to the questions and answers are read wherein the number of comments posted to the questions and answers on a software project over a period are obtained. The forum data obtained in the step 306.1 including questions data, answers data, comments data are analysed in the subsequent steps of 306.5, 306.6, 306.7 to identify the trend in the questions data, answers data and comments data over a period of time. Trend is a period over period change in the number of questions data, answers data and comments data. Trend can be positive, negative or neutral. After analysing the trend, rate of change in questions, answers and comments over a period is identified respectively in the steps 306.5, 306.6, 306.7. The rate of change values obtained as a result of trend analysis in the steps 306.5, 306.6, 306.7 are passed on to the compute trend analysis score 306.8 step. Trend analysis score is a score assigned based on the (percentage) % increase or decrease in questions, answers, comments related to a software project occurred during the intervals in the step 306.8. The Social Score Rating Service 116 receives these data and verifies whether any events have occurred during that interval. If the process 306, finds any event updates, the Social Score Rating Service 116 triggers a call to receive the details of the event—number of questions posted related to a software project, number of answers posted related to a software project, number of comments posted to the questions and answers on a software project and trend analysis score of questions, answers, comments related to a software project during these intervals. The data received from the project repository from these events are stored in the database. The data is segregated based on the pre-defined data range of the number of questions posted related to a software project, number of answers posted related to a software project, number of comments posted to the questions and answers on a software project and trend analysis score of questions, answers, comments related to a software project and scores are recomputed. The number of questions, answers, comments data over a period and trend analysis score of questions, answers, and comments data thus obtained are used in the step 306.9 to calculate the community activity score.

After the segregation based on the ranges, logarithmic with base 10 is applied over the data received (number of questions posted related to a software project, number of answers posted related to a software project, number of comments posted to the questions and answers on a software project and trend analysis score of questions, answers, comments related to a software project over the configured interval) for calculating the community activity score with accuracy and efficiency. Based on the determination of number of questions posted related to a software project, number of answers posted related to a software project, number of comments posted to the questions and answers on a software project and trend analysis score of questions, answers, comments related to a software project for an open-source software project, the community activity score is computed in step 306.9. The Community Activity Score is computed using a formula.

Figure 8:
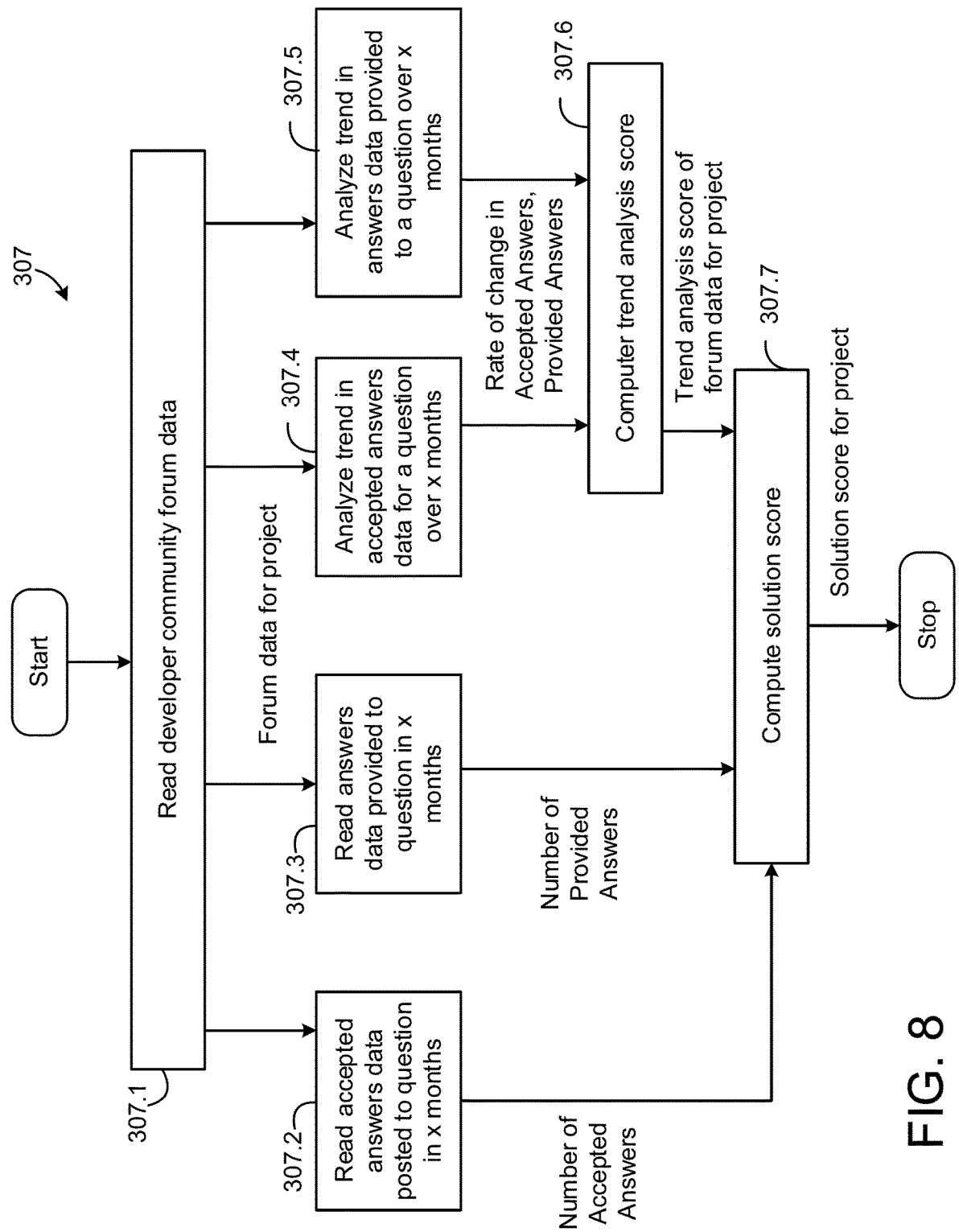
FIG. 8 shows the steps to calculate the solution score for the open-source projects, in accordance with some embodiments.

The parameter considered for the formula of community activity score are number of questions posted related to a software project, number of answers posted related to a software project, number of comments posted to the questions and answers on a software project and trend analysis score which is a score assigned based on the (percentage) % increase or decrease in questions, answers, comments related to a software project over a period. Period can be number of days, weeks, months or years. An example for calculating the Community Activity score in the step 306.9 is provided below:

Community Activity Score=$\log_{10}$(Number of Questions posted over $X$)+log 10 (Number of Answers posted over $X$)+$\log_{10}$(Number of Comments posted to the Questions and Answers over $X$)+Trend analysis score (Change in Number of Questions posted over $X$)+Trend analysis score (Change in Number of Answers posted over $X$)+Trend analysis score (Change in Number of Comments posted to the Questions and Answers over $X$), where X=Number of Days, Weeks, Months or Years FIG. 8, shows a detailed view of step 307, where the developer forum data on answers with solutions to the questions posted on the software project is used to calculate the solution score, in accordance with some embodiments. The processing uses the data including the number of solutions provided, the solutions which are accepted, the comments to the solutions to examine the trends, availability of accepted solutions and nature of comments on the solutions to create the solution score and saves it to the database.

Steps involved in calculating the solution score are as follows. The forum data for project obtained from the step 305 is collected, read, and stored in database for an open-source software project in step 307.1. The forum data thus obtained from the step 306.1 is used in the subsequent steps to calculate solution score. The project repositories and developer forums have set of event API pre-configured. Social Score Rating Service 116 polls at predefined intervals to call these event APIs. Intervals of polling can be configured. These event APIs returns data about the project from the developer forums. In the step 307.2, accepted answers data from the step 307.1 are read to obtain number of accepted answers posted related to a software project over a period. The number of answers provided to a question over a period related to a software project is obtained in the step 307.3 by reading provided answers data from 307.1. The forum data obtained in the step 307.1 containing questions data, answers data are analysed in the subsequent steps of 307.4, 307.5 to identify the trend in the accepted answers data and provided answers data over a period of time. Trend is a period over period change in the number of accepted answers data and provided answers data. Trend can be positive, negative or neutral. After analysing the trend, rate of change in accepted answers and provided answers over a period is identified respectively in the steps 307.4, 307.5. The rate of change values obtained as a result of trend analysis in the steps 307.4, 307.5 are passed on to the compute trend analysis score 307.6 step. Trend analysis score is a score assigned based on the % increase or decrease in number of answers, accepted answers related to a software project occurred during the intervals in the step 307.6. The Social Score Rating Service 116 receives these data and verifies whether any events have occurred during that interval.

If the Social Score Rating Service 116 finds any event updates, the Social Score Rating Service 116 triggers a call to receive the details of the event—number of accepted answers for a question related to a software project, number of answers provided for a question related to a software project and trend analysis score which is a score assigned based on the % increase or decrease in number of answers, accepted answers related to a software project during these intervals. The data received from the project repository from these events are stored in the Database 115. The data is segregated based on the pre-defined data range of the number of accepted answers for a question related to a software project, number of answers provided for a question related to a software project and trend analysis score which is a score assigned based on the % increase or decrease in number of answers, accepted answers related to a software project and scores are recomputed. The number of accepted answers, provided answers data over a period and trend analysis score of accepted answers, provided answers data thus obtained are used in the step 307.7 to calculate solution score.

After the segregation based on the ranges, logarithmic with base 10 is applied over the data received (number of accepted answers for a question related to a software project, number of answers provided for a question related to a software project and trend analysis score of number of answers, accepted answers related to a software project over the configured interval) for calculating the solution score with accuracy and efficiency. Based on the determination of number of accepted answers for a question related to a software project, number of answers provided for a question related to a software project and trend analysis score of number of answers, accepted answers for an open-source software project, the solution score is computed in step 307.7. The solution score is computed using a formula.

Figure 9:
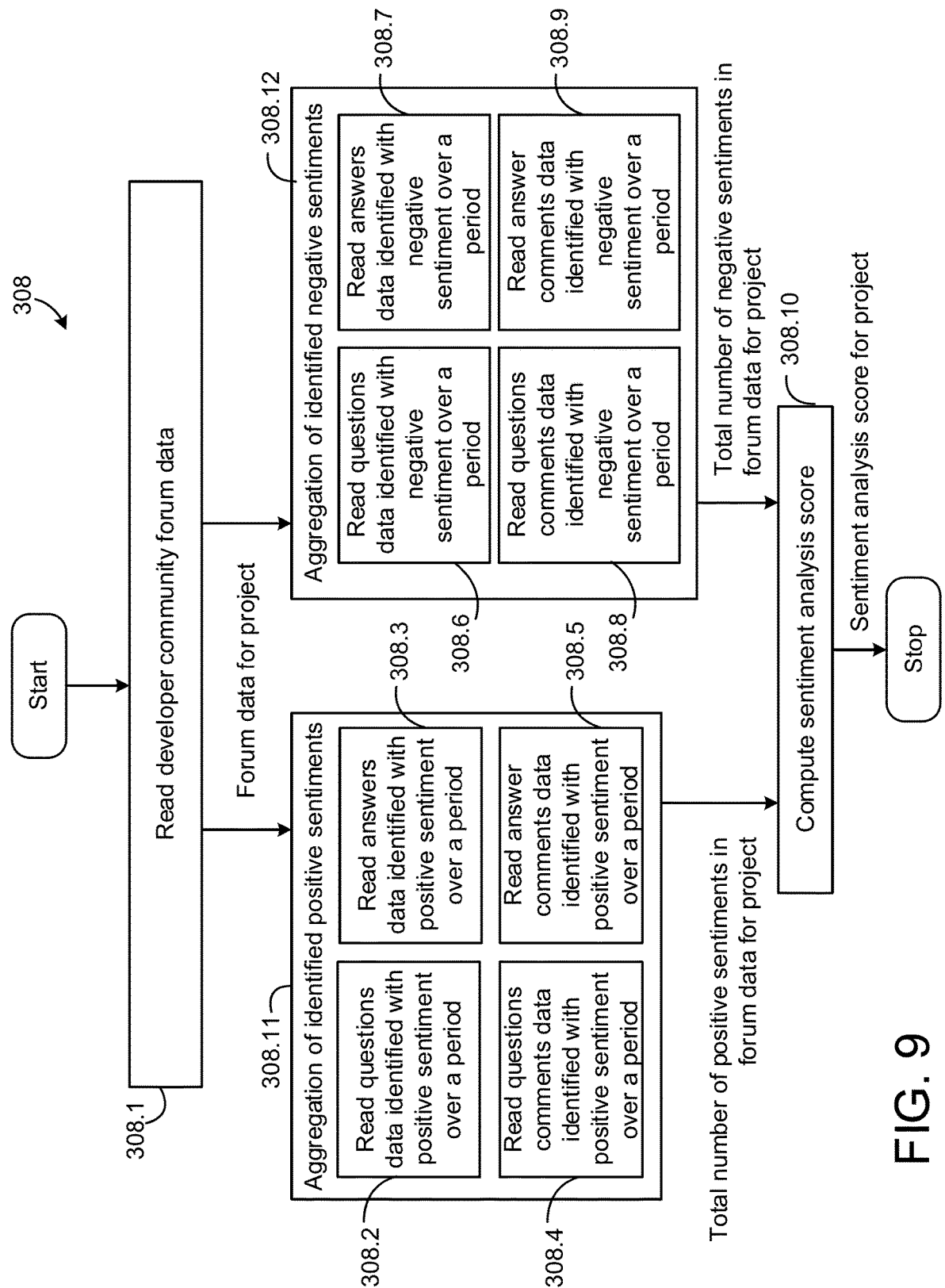
FIG. 9 shows the steps to calculate the sentiment analysis score for the open-source projects, in accordance with some embodiments.

The parameter considered for the formula of solution score are number of accepted answers for a question related to a software project, number of answers provided for a question related to a software project and trend analysis score which is a score assigned based on the % increase or decrease in number of answers, accepted answers related to a software project over a period. Period can be number of days, weeks, months or years, an example for calculating the solution score is provided below:

Solution Score=$\log_{10}$(Number of accepted answers for a question over $X$)+$\log_{10}$ (Number of answers provided for a question over $X$)+Trend analysis Score (Change in Number of accepted answers for a question over $X$)+Trend analysis Score (Change in Number of answers provided for question over $X$), where X=Number of Days, Weeks, Months or Years FIG. 9, shows a detailed view of step 308, where the System 100 determines the overall sentiment of the comments on the questions, answers, and solutions in the developer forum for the open-source software project, in accordance with some embodiments. The System 100 applies natural language processing techniques and machine learning classification techniques to classify the comments data into sentiments of neutral, positive, and negative categories with appropriate scores.

Steps involved in calculating the sentiment analysis score are as follows. The forum data for project obtained from the step 305 is collected, read, and stored in the Database 115 for an open-source software project in step 308.1. The forum data thus obtained from the step 306.1 is used in the subsequent steps to compute sentiment analysis score the project repositories have set of event API pre-configured. Social Score Rating Service 116 polls at predefined intervals to call these event APIs. Intervals of polling can be configured. These event APIs returns data about the project from the developer forums.

In step 308.11, which includes steps 308.2, 308.3, 308.4, and 308.5, positive sentiments are aggregated. The questions data identified with positive sentiment are read in step 308.2 wherein the number of questions identified with positive sentiments are obtained, the number of answers identified with positive sentiments are obtained in step 308.3 wherein the questions data with positive sentiments are read, the number of question comments identified with positive sentiments are obtained in step 308.4 by reading the question comment data identified with positive sentiment, the answer comments data identified with positive sentiment are read in the step 308.5 wherein the number of answer comments identified with positive sentiments are obtained.

In step 308.12, which includes steps 308.6, 308.7, 308.8, and 308.9, negative sentiments are aggregated. The number of questions identified with negative sentiments are obtained in step 308.6 by reading questions data identified with negative sentiments, the number of answers identified with negative sentiments are obtained in step 308.7 by reading answers data identified with negative sentiment, the number of question comments identified with negative sentiments are obtained in step 308.8 by reading the question comments data identified with negative sentiment. The number of answer comments identified with negative sentiments are obtained in step 308.9 by reading the answer comments data identified with negative sentiment related to a software project occurred during the intervals. The Social Score Rating Service 116 receives these data and verifies whether any events have occurred during that interval.

If the Social Score Rating Service 116, finds any event updates, the Social Score Rating Service 116 triggers a call to receive the details of the event—number of questions identified with positive sentiments, number of answers identified with positive sentiments, number of question comments identified with positive sentiments, number of answer comments identified with positive sentiments, number of questions identified with negative sentiments, number of answers identified with negative sentiments, number of question comments identified with negative sentiments and number of answer comments identified with negative sentiments related to a software project during these intervals. The data received from the project repository from these events are stored in the database. The data is segregated based on the pre-defined data range of the number of questions identified with positive sentiments, number of answers identified with positive sentiments, number of question comments identified with positive sentiments, number of answer comments identified with positive sentiments, number of questions identified with negative sentiments, number of answers identified with negative sentiments, number of question comments identified with negative sentiments and number of answer comments identified with negative sentiments related to a software project and scores are recomputed. The results of the steps 308.2-308.9 are passed on to the step 308.10 where the sentiment analysis score is calculated.

After the segregation based on the ranges, appending over the data received (number of questions identified with positive sentiments, number of answers identified with positive sentiments, number of question comments identified with positive sentiments, number of answer comments identified with positive sentiments, number of questions identified with negative sentiments, number of answers identified with negative sentiments, number of question comments identified with negative sentiments and number of answer comments identified with negative sentiments related to a software project over the configured interval) for calculating the sentiment analysis score with accuracy and efficiency. Based on the determination of number of questions identified with positive sentiments, number of answers identified with positive sentiments, number of question comments identified with positive sentiments, number of answer comments identified with positive sentiments, number of questions identified with negative sentiments, number of answers identified with negative sentiments, number of question comments identified with negative sentiments and number of answer comments identified with negative sentiments for an open-source software project, the sentiment analysis score is computed in step 308.10. The sentiment analysis score is computed using a formula.

The parameter considered for the formula of sentiment analysis score are number of questions identified with positive sentiments, number of answers identified with positive sentiments, number of question comments identified with positive sentiments, number of answer comments identified with positive sentiments, number of questions identified with negative sentiments, number of answers identified with negative sentiments, number of question comments identified with negative sentiments and number of answer comments identified with negative sentiments over a period. Period can be number of days, weeks, months or years. An example for calculating the sentiment analysis score in the step 308.10 is provided below:

Total Number of positive sentiments in $X$=(Number of Questions identified with Positive sentiments in $X$+Number of Answers identified with Positive sentiments in $X$+Number of Question comments identified with Positive sentiments in $X$+Number of Answer comments identified with Positive sentiments in $X$) in the developer forum.

Total Number of negative sentiments=(Number of Questions identified with Negative sentiments in $X$+Number of Answers identified with Negative sentiments in $X$+Number of Question comments identified with Negative sentiments in $X$+Number of Answer comments identified with Negative sentiments in $X$) in the developer forum.

Sentiment analysis score of Community content=Neutral value+(Total Number of Positive sentiments−Total Number of negative sentiments), where Neutral value=50 assuming equal number of positive and negative sentiments, and X=Number of Days, Weeks, Months or Years.

Figure 10:
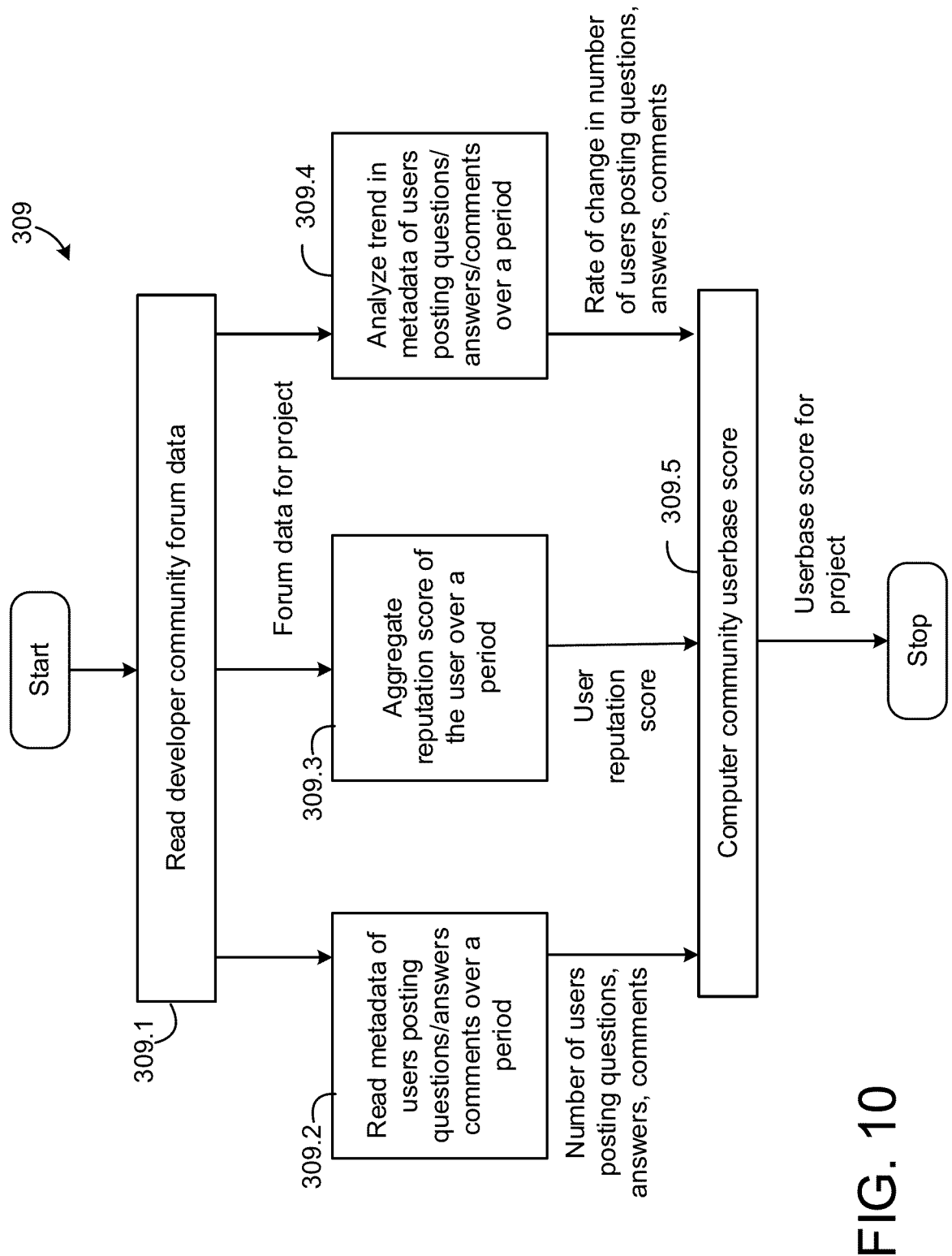
FIG. 10 shows the steps to calculate the community userbase score for the open-source projects, in accordance with some embodiments.

FIG. 10, shows aa detailed view of step 309, where the different user's data on the developer forums on responding to questions and providing solutions is used to calculate the userbase score which indicates the availability of good userbase for supporting in responding to queries in the developer forums, in accordance with some embodiments. The users who are responding to the questions and providing solutions are identified and their activity is examined to tag their expertise level on the open-source software project. The users providing good, acceptable, and valuable solutions to use cases are used to calculate the reputation score of the user across the developer forum. The trends of users providing good responses and solutions over a period is considered to calculate the overall userbase score.

Steps involved in calculating the community userbase score are as follows. The forum data for project obtained from the step 305 is collected, read, and stored in Database 115 for an open-source software project in step 309.1. The forum data thus obtained from the step 309.1 is used in the subsequent steps to compute community userbase score. The project repositories have set of event API pre-configured. Social Score Rating Service 116 polls at predefined intervals to call these event APIs. Intervals of polling can be configured. These event APIs returns data about the project from the developer forums. The number of users posting questions/answers/comments for a software project which includes the users data are obtained in step 309.2 by reading the users data obtained from the step 309.1. The reputation scores of the users are collected and aggregated in the step 309.3 by reading the users data to get their reputation scores. Reputation score of a user is a measure of user reputation in the developer forum which includes the number of positive feedbacks to the questions, answers and solutions provided by the user. In the step 309.4, users data are analyzed for trends or changes in the users data over a period of time and a trend analysis score is computed in the step 309.4. Trend analysis score is based on change in number of users posting questions/answers/comments over a period related to a software project occurred during the intervals. If the Social Score Rating Service 116 finds any event updates, the Social Score Rating Service 116 triggers a call to receive the details of the event—number of users posting questions/answers/comments for a software project, aggregated reputation score of a user which is the number of positive feedbacks to the questions, answers and solutions provided by the user and trend analysis score is based on change in number of users posting questions/answers/comments over a period related to a software project during these intervals. The data received from the project repository from these events are stored in the database. The data is segregated based on the pre-defined data range of the number of users posting questions/answers/comments for a software project, aggregated reputation score of a user which is the number of positive feedbacks to the questions, answers and solutions provided by the user and trend analysis score is based on change in number of users posting questions/answers/comments over a period related to a software project and scores are recomputed. The users data, user reputation data, trend analysis score are all used in the step 309.5 to compute community userbase score.

After the segregation based on the ranges, appending over the data received (number of users posting questions/answers/comments for a software project, aggregated reputation score of a user which is the number of positive feedbacks to the questions, answers and solutions provided by the user and trend analysis score is based on change in number of users posting questions/answers/comments over a period related to a software project over the configured interval) for calculating the community userbase score with accuracy and efficiency. Based on the determination of number of users posting questions/answers/comments for a software project, aggregated reputation score of a user which is a measure including the number of positive feedbacks to the questions, answers and solutions etc. provided by the user and trend analysis score is based on change in number of users posting questions/answers/comments over a period for an open-source software project, the community userbase score is computed in step 309.5. The community userbase score is computed using a formula.

The parameter considered for the formula of userbase score in the step 309.5 are number of users posting questions/answers/comments for a software project, aggregated reputation score of a user and trend analysis score based on change in number of users posting questions/answers/comments over a period. Period can be number of days, weeks, months or years. An example for calculating the userbase score is provided below Community Userbase Score=$\log_{10}$(Number of users posting questions/answers/comments for a software project over $X$)+$\log_{10}$(Median (Reputation Score of users over $X$)+Trend analysis score (Number of users posting questions/answers/comments provided by user over $X$), where X=Number of Days, Weeks, Months or Years.

Referring back to FIG. 3, the ecosystem activity score is calculated (step 310), based on the individual scores calculated in the previous steps as popularity score, repository activity score, defect rating score and social score (community activity score, solution score, sentiment analysis score, userbase score) are summed up to calculate the final ecosystem activity score. Once the final score is calculated, the user is notified to view the ecosystem activity score for the requested project.

An example for calculating the software ecosystem activity score (step 310) is provided as follows. Software ecosystem activity score=sum (calculate popularity rating score (step 302), calculate repository activity score (step 303), calculate defect fixing rate score (step 304), compute community activity score (step 306), compute solution score (step 307), compute sentiment analysis score (step 308), compute community userbase score (step 309)). A representative logic for calculating the software ecosystem activity score in the step 311 from sample scores of the steps 302-309 is shown below:

Popularity score calculated in step 302:
  popularityScore=4.782178
Repository Activity Score calculated in step 303:
  repoActivity Score=6.616342
Defect Fixing Rate Score calculated in step 304:
  defectFixingRateScore=2.308760
Community Activity Score calculated in step 306:
  communityActivity Score=11.410646
Solution Score calculated in step 307:
  solutionScore=12.616445
Sentiment Analysis Score calculated in step 308:
  sentimentScore=50.174176
Community Userbase Score calculated in step 309:
  communityUserbaseScore=7.026064
Software Ecosystem Activity Score=4.782178+ 6.616342+2.308760+11.410646+12.616445+ 50.174176+7.026064=94.934611

A representative sample which can be generated from step 310 for a software component is shown below:

```
{
  scores: {
    _id: 'django/django',
    popularityScore: 4.782178,
    repoActivityScore: 6.616342,
    defectFixingRateScore: 2.308760,
    communityActivity Score: 11.410646,
    solutionScore: 12.616445,
    sentimentScore: 50.174176,
    communityUserbaseScore: 7.026064,
    softwareEcosystemActivityScore : 94.934611,
  }
}
```

Figure 11:
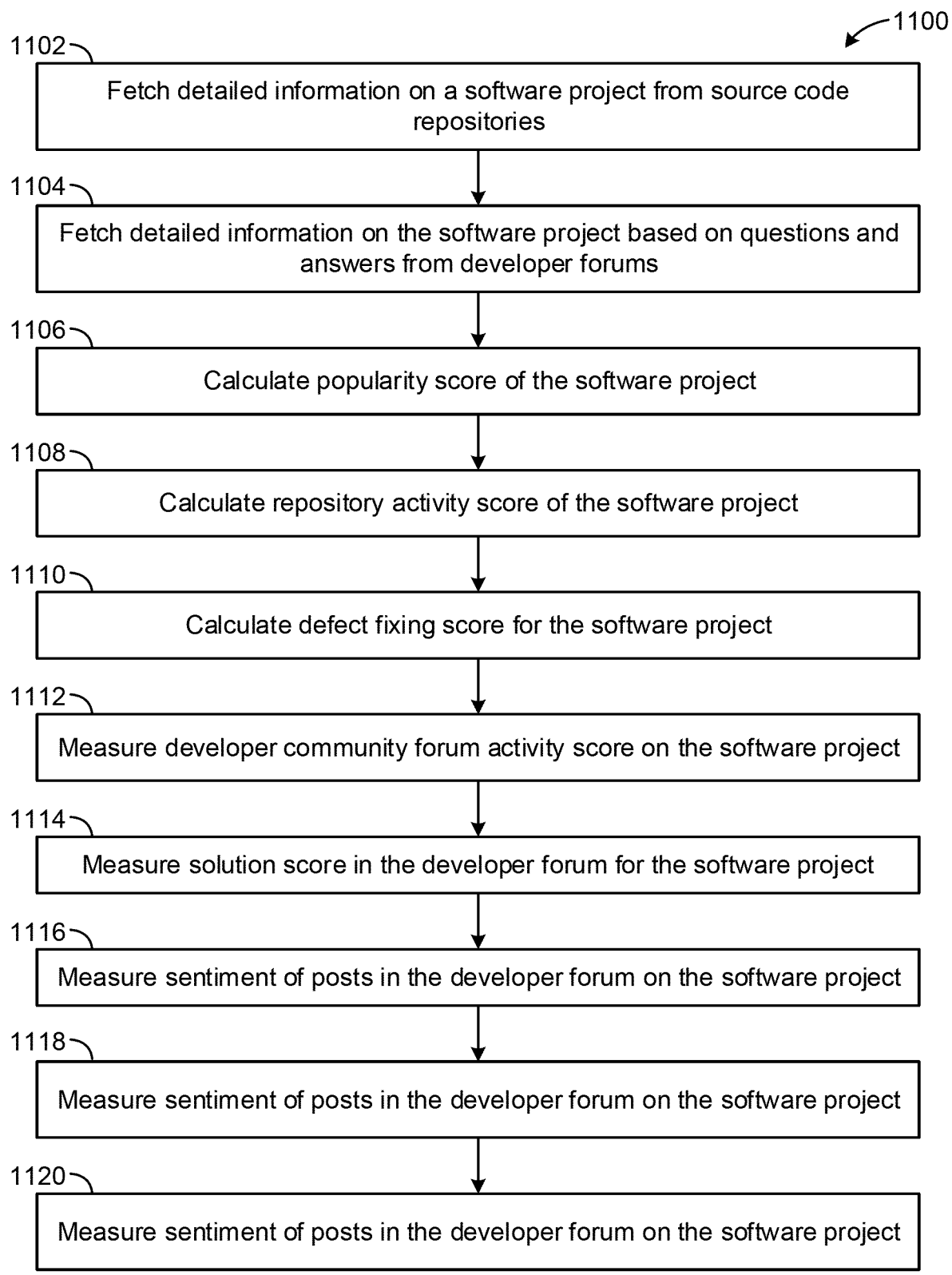
FIG. 11 shows a flow diagram showing a method of automated creation of software ecosystem activity score, in accordance with some embodiments.

FIG. 11 shows a flow diagram showing a method 1100 of automated creation of software ecosystem activity score, in accordance with some embodiments. At least one processor is provided that operates under control of a stored program comprising a sequence of program instructions comprising a step 1102 that states fetching of detailed information on a software project from source code repositories. Step 1104 that states fetching of detailed information on the software project based on questions and answers from developer forums. Step 1106 that states calculation of popularity score of the software project. Step 1108 that states calculation of repository activity score of the software project. Step 1110 that states calculation of defect fixing score for the software project. Step 1112 that states measurement of developer community forum activity score on the software project. Step 1114 that states measurement of solution score in the developer forum for the software project. Step 1116 that states measurement of sentiment of posts in the developer forum on the software project. Step 1118 that states measurement of userbase score in the developer forum on the software project. Finally, Step 1120 that states computation of a consolidated ecosystem activity score for the software project.

Figure 12:
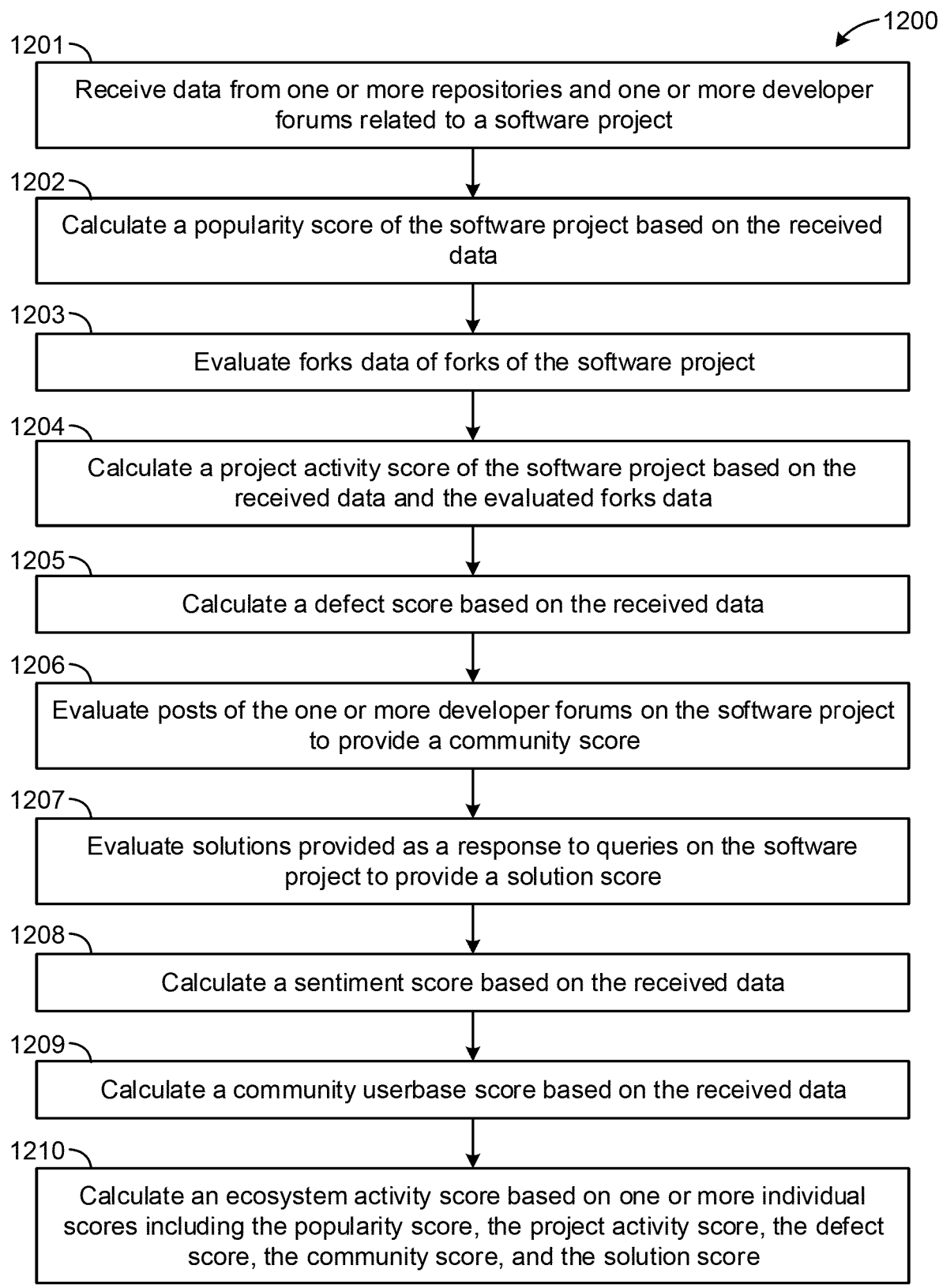
FIG. 12 shows a flow diagram showing another method of automated creation of software ecosystem activity score, in accordance with some embodiments.

FIG. 12 shows a process 1200 that can be performed by a computer program product for automated scoring of ecosystem activity for software projects. Process 1200 can be performed by one or more components of system 100 as previously described. The computer program product for automated software natural language documentation comprises a processor and memory storing instructions. The instructions when executed by the processor causes the processor to perform multiple steps. The processor receives data from one or more repositories and one or more developer forums related to a software project (step 1201) and calculates a popularity score of the software project based on the received data (step 1202). The processor evaluates forks data of forks of the software project (step 1203) and calculates a project activity score of the software project based on the received data and the evaluated forks data (step 1204). The processor calculates a defect score based on the received data (step 1205). The processor evaluates posts of the one or more developer forums on the software project to provide a community score (step 1206) and evaluates solutions provided as a response to queries on the software project to provide a solution score (step 1207). The processor calculates a sentiment score based on the received data (step 1208) and calculates a community userbase score based on the received data (step 1209). The processor calculates an ecosystem activity score based on one or more individual scores including the popularity score, the project activity score, the defect score, the community score, the solution score, sentiment score, or community userbase score (step 1210).

The ecosystem activity score calculated for a software component/open source library helps the developer to make a decision for choosing appropriate libraries and helps them determine whether or not to use that library/software component for building software applications. It also helps the developer to determine the use of cleaner and secure code to use in building their applications. It would also provide the user a link to download the code of a library with maximum score among many possible libraries performing similar task thereby the user would be able to use the most appropriate library without any difficulty.

The system after calculating the ecosystem activity score may suggest an automated list of libraries to the user for performing a certain task based on different criteria provided by the user. For example, if the user requests for libraries to perform data analysis on data using python language, the system analyses different libraries available and calculates the ecosystem activity score for every library and once the score is calculated, the system suggests the libraries with maximum activity score based on the criteria requested by the user. For example, the system may analyze different data analysis libraries in Python (e.g., pandas, dask, numpy, scipy etc.) and find the ecosystem activity score for all. It then may suggest the user the most suitable one among these based on the ecosystem activity score by providing the suggestion and/or recommendation via the user terminal (e.g., project information portal 101).

As will be appreciated by one of skill in the art, the present disclosure may be embodied as a method and system. Accordingly, the present disclosure may take the form of an entirely hardware embodiment, a software embodiment or an embodiment combining software and hardware aspects. It will be understood that the functions of any of the units as described above can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts performed by any of the units as described above.

Instructions may also be stored in a computer-readable memory that can direct a computer or other programmable data processing apparatus to function in a particular manner, such that the instructions stored in the computer-readable memory produce an article of manufacture including instruction means which implement the function/act performed by any of the units as described above.

Instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts performed by any of the units as described above.

In the specification, there has been disclosed exemplary embodiments of the disclosure. Although specific terms are employed, they are used in a generic and descriptive sense only and not for purposes of limitation of the scope of the disclosure.

What is claimed is:

1. A system for providing software downloads, the system comprising:
   one or more processors and memory storing instructions that, when executed by the one or more processors, cause the one or more processors to perform operations comprising:
   receiving criteria from a user;
   determining a plurality of software projects satisfying the criteria provided by the user;
   automatically generating, for each of the plurality of software projects, an ecosystem activity score by:
      receiving data from one or more repositories and one or more developer forums related to a software project;
      calculating a popularity score of the software project based on the received data;
      calculating a project activity score of the software project based on the received data;
      calculating a defect score based on the received data;
      calculating a community score by evaluating posts of the one or more developer forums on the software project;
      calculating a solution score by evaluating solutions provided as a response to queries on the software project;
      calculating a sentiment score by applying natural language processing and machine learning classification techniques to classify natural-language questions, answers, and comments in a developer forum relating to the software project into positive and negative sentiment categories;
      calculating a userbase score by evaluating metadata of user posts, reputation score, and trends in metadata of users; and calculating the ecosystem activity score based on the popularity score, the project activity score, the defect score, the community score, the solution score, the sentiment score, and the userbase score;

providing a recommended software project of the plurality of software projects to the user based on the recommended software project having a maximum activity score of the ecosystem activity scores; and providing a link to download the recommended software project.

2. The system of claim 1, the operations further comprising accepting project details that include name, details of repository, remote location URL of the project, and user email details for sending notifications.

3. The system of claim 1, the operations further comprising calculating the ecosystem activity score based on weighting of individual scores comprising the popularity score, the project activity score, the defect score, the community score, the solution score, the sentiment score, and the userbase score.

4. The system of claim 1, the operations further comprising:
periodically monitoring the software project; and
gathering project related information from external systems and scoring activities.

5. The system of claim 1, the operations further comprising:
retrieving measures of reviews, star ratings, stars for a given software project;
computing the popularity score based on the retrieved measurements; and
normalizing the retrieved measurements to a predetermined scale.

6. The system of claim 1, the operations further comprising:
analyzing project releases information;
examining a trend of releases from a predetermined period, number of contributors to each release, and contributors' activity for each release; and
computing the project activity score based on the trend of release frequency, a recentness of last release, and a trend of number of active contributors to the release.

7. The system of claim 1, the operations further comprising:
fetching the software project's different fork details;
examining creation dates of the forks and activity of the forks; and
computing a fork score for the fork's activity.

8. The system of claim 1, the operations further comprising:
fetching the software project's issues over a period;
examining when issue reports for the issues were opened and when they were closed; and
calculating the defect fixing score.

9. The system of claim 1, the operations further comprising:
fetching data of questions, answers, comments, solutions, and posting user data; and
computing the one or more scores on the activity in the developer forums.

10. The system of claim 1, the operations further comprising:
examining comments to the solutions proposed and the solutions that are marked as accepted; and
calculating quality of solutions provided as the response to the queries asked in the developer forums.

11. The system of claim 1, the operations further comprising:
providing different connectors to the different data sources of project information; and
providing database and file storage integration services for other processing services to fetch and write the data.

12. A method, the method comprising:
receiving criteria from a user;
determining a plurality of software projects satisfying the criteria provided by the user;
automatically generating, for each of the plurality of software projects, an ecosystem activity score by:
receiving data from one or more repositories and one or more developer forums related to the software project;
calculating a popularity score of the software project based on the received data;
calculating a project activity score of the software project based on the received data;
calculating a defect score based on the received data;
calculating a community score by evaluating posts of the one or more developer forums on the software project;
calculating a solution score by evaluating solutions provided as a response to queries on the software project;
calculating a sentiment score by applying natural language processing and machine learning classification techniques to classify natural-language questions, answers, and comments in a developer forum relating to the software project into positive and negative sentiment categories;
calculating a userbase score by evaluating metadata of user posts, reputation score, and trends in metadata of users; and
calculating the ecosystem activity score based on the popularity score, the project activity score, the defect score, the community score, the solution score, the sentiment score, and the userbase score;
providing a recommended software project of the plurality of software projects to the user based on the recommended software project having a maximum activity score of the ecosystem activity scores; and
providing a link to download the recommended software project.

13. The method of claim 12, wherein receiving data from the one or more repositories comprises:
connecting to the source code repository; and
receiving data on star ratings or stars, watchers' information, forks information, project releases, contributor information, pull requests for code submissions, bugs information, and issues information.

14. The method of claim 12, wherein receiving data from the one or more developer forums comprises:
connecting to a developer forum site using provided API; and
receiving data from the one or more developer forums including at least one of the questions posted for projects, comments, the answers to the questions, solutions provided, or posting user information.

15. The method of claim 12, wherein calculating the popularity score comprises:
processing, via natural language processing, one or more of the ratings, reviews, or stars received by the software project;

computing overall trend of the data over a predetermined period and factoring the overall trend in an overall calculation; and tagging the software projects based on the scores with qualifiers including one of ever popular, upcoming, or maintained.

16. The method of claim 12, wherein calculating the project activity score comprises:

examining information on the project release over a defined period to understand a trend of frequency of the project releases;

processing fork data of the software project, code changes data to determine number of changes, frequency, and trends of this information; and calculating the project activity score based on one or more of the processed fork data, or code changes data, the frequency, or the trends.

17. The method of claim 12, wherein calculating the defect score for the software project comprises:

fetching issues related data including issue opened date, closed date, current open defects and issues, and severity information;

analyzing a trend of the issues related data; and creating the defect fixing score based on the fetched issues related data.

18. The method of claim 12, wherein evaluating the posts of the one or more developer forums on the software project to provide the community score comprises:

fetching developer forum data on the questions, the answers, and the comments posted related to the software project;

consolidating the developer forum data of the questions, the answers and the comments over a period to determine trend and recentness of the posts related to the questions, answers and the comments for the software project; and computing a community activity score and saving the community activity score in a database.

19. The method of claim 12, wherein evaluating the solutions provided as a response to queries on the software project to provide the solution score comprises:

fetching the answers with the solutions to the questions posted on the software project from the developer forum; and processing data on number of solutions provided, solutions which are accepted, comments on the solutions to examine the trends, availability of accepted solutions and nature of the comments on the solutions to create the solution score and saves the solution score to the database.

20. The method of claim 12, wherein the calculating the userbase score comprises:

identifying the users engaging in the developer forums by providing the questions, the answers, the comments and the solutions on the software project;

getting activity of the user across the developer forum to tag expertise level of the user on the software project;

analyzing the trends of the users providing the questions, the answers, the comments and the solutions over a period;

calculating the userbase score with activity data of the user and the trend data.

21. The method of claim 12, wherein the computation of the ecosystem activity score comprises:

fetching individual scores; and calculating the consolidated ecosystem activity score by adding the individual scores.

22. A computer program product for automated creation of software ecosystem activity score, comprising a processor and memory storing instructions thereon, wherein the instructions when executed by the processor cause the processor to:

receive criteria from a user;

determine a plurality of software projects satisfying the criteria provided by the user;

automatically generate, for each of the plurality of software projects, an ecosystem activity score by further causing the processor to:

receive data from one or more repositories and one or more developer forums related to a software project;

calculate a popularity score of the software project based on the received data;

calculate a project activity score of the software project based on the received data;

calculate a defect score based on the received data;

calculate a community score by evaluating posts of the one or more developer forums on the software project;

calculate a solution score by evaluating solutions provided as a response to queries on the software project;

calculate a sentiment score by applying natural language processing and machine learning classification techniques to classify natural-language questions, answers, and comments in a developer forum relating to the software project into positive and negative sentiment categories;

calculate a userbase score by evaluating metadata of user posts, reputation score, and trends in metadata of users; and calculate the ecosystem activity score based the popularity score, the project activity score, the defect score, the community score, the solution score, the sentiment score, and the userbase score;

provide a recommended software project of the plurality of software projects to the user based on the recommended software project having a maximum activity score of the ecosystem activity scores; and provide a link to download the recommended software project.

* * * * *